(12) United States Patent
Law

(10) Patent No.: US 11,356,257 B2
(45) Date of Patent: Jun. 7, 2022

(54) SECURE REMOTE TOKEN RELEASE WITH ONLINE AUTHENTICATION

(71) Applicant: Visa International Service Association, San Francisco, CA (US)

(72) Inventor: Simon Law, San Mateo, CA (US)

(73) Assignee: Visa International Service Association, San Francisco, CA (US)

(*) Notice: Subject to any disclaimer, the term of this patent is extended or adjusted under 35 U.S.C. 154(b) by 0 days.

(21) Appl. No.: 16/977,645

(22) PCT Filed: Aug. 16, 2018

(86) PCT No.: PCT/IB2018/056173
§ 371 (c)(1),
(2) Date: Sep. 2, 2020

(87) PCT Pub. No.: WO2019/171163
PCT Pub. Date: Sep. 12, 2019

(65) Prior Publication Data
US 2021/0051012 A1    Feb. 18, 2021

Related U.S. Application Data

(60) Provisional application No. 62/639,652, filed on Mar. 7, 2018.

(51) Int. Cl.
*H04L 9/30* (2006.01)
*H04L 9/08* (2006.01)
*H04L 9/32* (2006.01)

(52) U.S. Cl.
CPC ............... *H04L 9/30* (2013.01); *H04L 9/088* (2013.01); *H04L 9/3228* (2013.01); *H04L 9/3231* (2013.01)

(58) Field of Classification Search
CPC ......... H04L 9/30; H04L 9/088; H04L 9/3228; H04L 9/3231; H04L 63/0861;
(Continued)

(56) References Cited

U.S. PATENT DOCUMENTS

| 5,280,527 A | 1/1994 | Gullman |
| 5,613,012 A | 3/1997 | Hoffman |

(Continued)

FOREIGN PATENT DOCUMENTS

| EP | 1028401 A2 | 8/2000 |
| EP | 2156397 A1 | 2/2010 |

(Continued)

OTHER PUBLICATIONS

Application No. PCT/IB2018/056173, International Search Report and Written Opinion, dated Dec. 10, 2018, 14 pages.

(Continued)

*Primary Examiner* — Techane Gergiso
(74) *Attorney, Agent, or Firm* — Kilpatrick Townsend & Stockton LLP

(57) ABSTRACT

A system and techniques are described herein for providing authentication. The technique includes registering user authentication data such as biometrics data with a communication device. The authentication data is linked to an account or service provider, and is used to verify the identity of the user when accessing the account. The communication device may obtain a public/private key pair, for which the pubic key may be stored on a secure remote server. When the user attempts to access the account or service provider, the user may provide the authentication data to authenticate the user to the communication device. Thereafter, the communication device may sign an authentication indicator using the private key and send the authentication indicator to the secure remote server. Upon verification of the signature (Continued)

using the public key, the secure remote server may grant access to the user, for example, by releasing a token.

16 Claims, 9 Drawing Sheets

(58) Field of Classification Search
CPC ......... H04L 2463/082; H04L 2463/081; H04L 63/0823; H04L 63/0838; H04L 2209/56; H04L 63/0807; H04L 63/18; H04L 9/3247; H04L 9/3213; G06Q 20/4014; G06Q 20/401; G06Q 20/3829; G06Q 20/4012; G06Q 20/40145; G06Q 20/4015; G06Q 20/40155; G06Q 20/4016; G06Q 20/4018; G06Q 20/409; G06Q 20/4093; G06Q 20/4097; G06Q 20/40975; G06Q 20/3821; G06Q 20/38215; G06Q 20/3823; G06Q 20/3825; G06Q 20/3827; G06F 21/33; G07F 7/08; G07F 7/0806; G07F 7/0813; G07F 7/0826; G07F 7/082; G07F 7/084
See application file for complete search history.

(56) References Cited

U.S. PATENT DOCUMENTS

| | | |
|---|---|---|
| 5,781,438 A | 7/1998 | Lee |
| 5,883,810 A | 3/1999 | Franklin |
| 5,930,767 A | 7/1999 | Reber |
| 5,953,710 A | 9/1999 | Fleming |
| 5,956,699 A | 9/1999 | Wong |
| 6,000,832 A | 12/1999 | Franklin |
| 6,014,635 A | 1/2000 | Harris |
| 6,044,360 A | 3/2000 | Picciallo |
| 6,163,771 A | 12/2000 | Walker |
| 6,227,447 B1 | 5/2001 | Campisano |
| 6,236,981 B1 | 5/2001 | Hill |
| 6,267,292 B1 | 7/2001 | Walker |
| 6,327,578 B1 | 12/2001 | Linehan |
| 6,341,724 B2 | 1/2002 | Campisano |
| 6,385,596 B1 | 5/2002 | Wiser |
| 6,422,462 B1 | 7/2002 | Cohen |
| 6,425,523 B1 | 7/2002 | Shem Ur |
| 6,453,301 B1 | 9/2002 | Niwa |
| 6,592,044 B1 | 7/2003 | Wong |
| 6,636,833 B1 | 10/2003 | Flitcroft |
| 6,748,367 B1 | 6/2004 | Lee |
| 6,805,287 B2 | 10/2004 | Bishop |
| 6,879,965 B2 | 4/2005 | Fung |
| 6,891,953 B1 | 5/2005 | DeMello |
| 6,901,387 B2 | 5/2005 | Wells |
| 6,931,382 B2 | 8/2005 | Laage |
| 6,938,019 B1 | 8/2005 | Uzo |
| 6,941,285 B2 | 9/2005 | Sarcanin |
| 6,980,670 B1 | 12/2005 | Hoffman |
| 6,990,470 B2 | 1/2006 | Hogan |
| 6,991,157 B2 | 1/2006 | Bishop |
| 7,051,929 B2 | 5/2006 | Li |
| 7,069,249 B2 | 6/2006 | Stolfo |
| 7,103,576 B2 | 9/2006 | Mann, III |
| 7,113,930 B2 | 9/2006 | Eccles |
| 7,136,835 B1 | 11/2006 | Flitcroft |
| 7,177,835 B1 | 2/2007 | Walker |
| 7,177,848 B2 | 2/2007 | Hogan |
| 7,194,437 B1 | 3/2007 | Britto |
| 7,209,561 B1 | 4/2007 | Shankar et al. |
| 7,264,154 B2 | 9/2007 | Harris |
| 7,287,692 B1 | 10/2007 | Patel |
| 7,292,999 B2 | 11/2007 | Hobson |
| 7,350,230 B2 | 3/2008 | Forrest |
| 7,353,382 B2 | 4/2008 | Labrou |
| 7,379,919 B2 | 5/2008 | Hogan |
| RE40,444 E | 7/2008 | Linehan |
| 7,415,443 B2 | 8/2008 | Hobson |
| 7,444,676 B1 | 10/2008 | Asghari-Kamrani |
| 7,469,151 B2 | 12/2008 | Khan |
| 7,548,889 B2 | 6/2009 | Bhambri |
| 7,567,934 B2 | 7/2009 | Flitcroft |
| 7,567,936 B1 | 7/2009 | Peckover |
| 7,571,139 B1 | 8/2009 | Giordano |
| 7,571,142 B1 | 8/2009 | Flitcroft |
| 7,580,898 B2 | 8/2009 | Brown |
| 7,584,153 B2 | 9/2009 | Brown |
| 7,593,896 B1 | 9/2009 | Flitcroft |
| 7,606,560 B2 | 10/2009 | Labrou |
| 7,627,531 B2 | 12/2009 | Breck |
| 7,627,895 B2 | 12/2009 | Gifford |
| 7,650,314 B1 | 1/2010 | Saunders |
| 7,685,037 B2 | 3/2010 | Reiners |
| 7,702,578 B2 | 4/2010 | Fung |
| 7,707,120 B2 | 4/2010 | Dominguez |
| 7,712,655 B2 | 5/2010 | Wong |
| 7,734,527 B2 | 6/2010 | Uzo |
| 7,753,265 B2 | 7/2010 | Harris |
| 7,770,789 B2 | 8/2010 | Oder, II |
| 7,784,685 B1 | 8/2010 | Hopkins, III |
| 7,793,851 B2 | 9/2010 | Mullen |
| 7,801,826 B2 | 9/2010 | Labrou |
| 7,805,376 B2 | 9/2010 | Smith |
| 7,805,378 B2 | 9/2010 | Berardi |
| 7,818,264 B2 | 10/2010 | Hammad |
| 7,828,220 B2 | 11/2010 | Mullen |
| 7,835,960 B2 | 11/2010 | Breck |
| 7,841,523 B2 | 11/2010 | Oder, II |
| 7,841,539 B2 | 11/2010 | Hewton |
| 7,844,550 B2 | 11/2010 | Walker |
| 7,848,980 B2 | 12/2010 | Carlson |
| 7,849,020 B2 | 12/2010 | Johnson |
| 7,853,529 B1 | 12/2010 | Walker |
| 7,853,995 B2 | 12/2010 | Chow |
| 7,865,414 B2 | 1/2011 | Fung |
| 7,873,579 B2 | 1/2011 | Hobson |
| 7,873,580 B2 | 1/2011 | Hobson |
| 7,890,393 B2 | 2/2011 | Talbert |
| 7,891,563 B2 | 2/2011 | Oder, II |
| 7,896,238 B2 | 3/2011 | Fein |
| 7,908,216 B1 | 3/2011 | Davis et al. |
| 7,922,082 B2 | 4/2011 | Muscato |
| 7,931,195 B2 | 4/2011 | Mullen |
| 7,937,324 B2 | 5/2011 | Patterson |
| 7,938,318 B2 | 5/2011 | Fein |
| 7,954,705 B2 | 6/2011 | Mullen |
| 7,959,076 B1 | 6/2011 | Hopkins, III |
| 7,996,288 B1 | 8/2011 | Stolfo |
| 8,025,223 B2 | 9/2011 | Saunders |
| 8,046,256 B2 | 10/2011 | Chien |
| 8,060,448 B2 | 11/2011 | Jones |
| 8,060,449 B1 | 11/2011 | Zhu |
| 8,074,877 B2 | 12/2011 | Mullen |
| 8,074,879 B2 | 12/2011 | Harris |
| 8,082,210 B2 | 12/2011 | Hansen |
| 8,095,113 B2 | 1/2012 | Kean |
| 8,104,679 B2 | 1/2012 | Brown |
| RE43,157 E | 2/2012 | Bishop |
| 8,109,436 B1 | 2/2012 | Hopkins, III |
| 8,121,942 B2 | 2/2012 | Carlson |
| 8,121,956 B2 | 2/2012 | Carlson |
| 8,126,449 B2 | 2/2012 | Beenau |
| 8,132,723 B2 | 3/2012 | Serve |
| 8,171,525 B1 | 5/2012 | Pelly |
| 8,175,973 B2 | 5/2012 | Davis et al. |
| 8,190,523 B2 | 5/2012 | Patterson |
| 8,196,813 B2 | 6/2012 | Vadhri |
| 8,205,791 B2 | 6/2012 | Randazza |
| 8,219,489 B2 | 7/2012 | Patterson |
| 8,224,702 B2 | 7/2012 | Mengerink |
| 8,225,385 B2 | 7/2012 | Chow |
| 8,229,852 B2 | 7/2012 | Carlson |
| 8,265,993 B2 | 9/2012 | Chien |
| 8,280,777 B2 | 10/2012 | Mengerink |
| 8,281,991 B2 | 10/2012 | Wentker et al. |
| 8,328,095 B2 | 12/2012 | Oder, II |

(56) References Cited

U.S. PATENT DOCUMENTS

| | | |
|---|---|---|
| 8,336,088 B2 | 12/2012 | Raj et al. |
| 8,346,666 B2 | 1/2013 | Lindelsee et al. |
| 8,376,225 B1 | 2/2013 | Hopkins, III |
| 8,380,177 B2 | 2/2013 | Laracey |
| 8,387,873 B2 | 3/2013 | Saunders |
| 8,401,539 B2 | 3/2013 | Beenau |
| 8,401,898 B2 | 3/2013 | Chien |
| 8,402,555 B2 | 3/2013 | Grecia |
| 8,403,211 B2 | 3/2013 | Brooks |
| 8,412,623 B2 | 4/2013 | Moon |
| 8,412,837 B1 | 4/2013 | Emigh |
| 8,417,642 B2 | 4/2013 | Oren |
| 8,447,699 B2 | 5/2013 | Batada |
| 8,453,223 B2 | 5/2013 | Svigals |
| 8,453,925 B2 | 6/2013 | Fisher |
| 8,458,487 B1 | 6/2013 | Palgon |
| 8,484,134 B2 | 7/2013 | Hobson |
| 8,485,437 B2 | 7/2013 | Mullen |
| 8,494,959 B2 | 7/2013 | Hathaway |
| 8,498,908 B2 | 7/2013 | Mengerink |
| 8,504,475 B2 | 8/2013 | Brand et al. |
| 8,504,478 B2 | 8/2013 | Saunders |
| 8,510,816 B2 | 8/2013 | Quach |
| 8,528,067 B2 | 9/2013 | Hurry et al. |
| 8,533,116 B2 | 9/2013 | Davis et al. |
| 8,533,860 B1 | 9/2013 | Grecia |
| 8,538,845 B2 | 9/2013 | Liberty |
| 8,555,079 B2 | 10/2013 | Shablygin |
| 8,566,168 B1 | 10/2013 | Bierbaum |
| 8,567,670 B2 | 10/2013 | Stanfield |
| 8,571,939 B2 | 10/2013 | Lindsey |
| 8,577,336 B2 | 11/2013 | Mechaley, Jr. |
| 8,577,803 B2 | 11/2013 | Chatterjee |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | Mcguire |
| 8,589,237 B2 | 11/2013 | Fisher |
| 8,589,271 B2 | 11/2013 | Evans |
| 8,589,291 B2 | 11/2013 | Carlson |
| 8,595,098 B2 | 11/2013 | Starai |
| 8,595,812 B2 | 11/2013 | Bomar |
| 8,595,850 B2 | 11/2013 | Spies |
| 8,606,638 B2 | 12/2013 | Dragt |
| 8,606,700 B2 | 12/2013 | Carlson |
| 8,606,720 B1 | 12/2013 | Baker |
| 8,615,468 B2 | 12/2013 | Varadarajan |
| 8,620,754 B2 | 12/2013 | Fisher |
| 8,635,157 B2 | 1/2014 | Smith |
| 8,646,059 B1 | 2/2014 | Von Behren |
| 8,651,374 B2 | 2/2014 | Brabson |
| 8,656,180 B2 | 2/2014 | Shablygin |
| 8,751,391 B2 | 6/2014 | Freund |
| 8,751,642 B2 | 6/2014 | Vargas |
| 8,762,263 B2 | 6/2014 | Gauthier et al. |
| 8,793,186 B2 | 7/2014 | Patterson |
| 8,838,982 B2 | 9/2014 | Carlson et al. |
| 8,856,539 B2 | 10/2014 | Weiss |
| 8,887,308 B2 | 11/2014 | Grecia |
| 9,065,643 B2 | 6/2015 | Hurry et al. |
| 9,070,129 B2 | 6/2015 | Sheets et al. |
| 9,100,826 B2 | 8/2015 | Weiss |
| 9,160,741 B2 | 10/2015 | Wentker et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 9,519,901 B1 | 12/2016 | Dorogusker |
| 9,530,137 B2 | 12/2016 | Weiss |
| 9,646,303 B2 | 5/2017 | Karpenko |
| 9,680,942 B2 | 6/2017 | Dimmick |
| 9,780,950 B1 | 10/2017 | Dundas et al. |
| 2001/0029485 A1 | 10/2001 | Brody |
| 2001/0034720 A1 | 10/2001 | Armes |
| 2001/0054003 A1 | 12/2001 | Chien |
| 2002/0007320 A1 | 1/2002 | Hogan |
| 2002/0016749 A1 | 2/2002 | Borecki |
| 2002/0029193 A1 | 3/2002 | Ranjan |
| 2002/0035548 A1 | 3/2002 | Hogan |
| 2002/0056043 A1 | 5/2002 | Glass |
| 2002/0073045 A1 | 6/2002 | Rubin |
| 2002/0116341 A1 | 8/2002 | Hogan |
| 2002/0133467 A1 | 9/2002 | Hobson |
| 2002/0147913 A1 | 10/2002 | Lun Yip |
| 2003/0028481 A1 | 2/2003 | Flitcroft |
| 2003/0130955 A1 | 7/2003 | Hawthorne |
| 2003/0191709 A1 | 10/2003 | Elston |
| 2003/0191945 A1 | 10/2003 | Keech |
| 2004/0010462 A1 | 1/2004 | Moon |
| 2004/0044739 A1* | 3/2004 | Ziegler ............... G06Q 20/4014 709/213 |
| 2004/0050928 A1 | 3/2004 | Bishop |
| 2004/0059682 A1 | 3/2004 | Hasumi |
| 2004/0093281 A1 | 5/2004 | Silverstein |
| 2004/0139008 A1 | 7/2004 | Mascavage |
| 2004/0143532 A1 | 7/2004 | Lee |
| 2004/0158532 A1 | 8/2004 | Breck |
| 2004/0210449 A1 | 10/2004 | Breck |
| 2004/0210498 A1 | 10/2004 | Freund |
| 2004/0232225 A1 | 11/2004 | Bishop |
| 2004/0236632 A1 | 11/2004 | Maritzen |
| 2004/0260646 A1 | 12/2004 | Berardi |
| 2005/0037735 A1 | 2/2005 | Coutts |
| 2005/0080730 A1 | 4/2005 | Sorrentino |
| 2005/0108178 A1 | 5/2005 | York |
| 2005/0199709 A1 | 9/2005 | Linlor |
| 2005/0246293 A1 | 11/2005 | Ong |
| 2005/0269401 A1 | 12/2005 | Spitzer |
| 2005/0269402 A1 | 12/2005 | Spitzer |
| 2006/0235795 A1 | 10/2006 | Johnson |
| 2006/0237528 A1 | 10/2006 | Bishop |
| 2006/0278704 A1 | 12/2006 | Saunders |
| 2007/0107044 A1 | 5/2007 | Yuen |
| 2007/0129955 A1 | 6/2007 | Dalmia |
| 2007/0136193 A1 | 6/2007 | Starr |
| 2007/0136211 A1 | 6/2007 | Brown |
| 2007/0170247 A1 | 7/2007 | Friedman |
| 2007/0179885 A1 | 8/2007 | Bird |
| 2007/0198432 A1* | 8/2007 | Pitroda ............... G06Q 20/42 705/64 |
| 2007/0208671 A1 | 9/2007 | Brown |
| 2007/0245414 A1 | 10/2007 | Chan |
| 2007/0288377 A1 | 12/2007 | Shaked |
| 2007/0291995 A1 | 12/2007 | Rivera |
| 2008/0015988 A1 | 1/2008 | Brown |
| 2008/0029607 A1 | 2/2008 | Mullen |
| 2008/0035738 A1 | 2/2008 | Mullen |
| 2008/0052226 A1 | 2/2008 | Agarwal |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan |
| 2008/0065555 A1 | 3/2008 | Mullen |
| 2008/0201264 A1 | 8/2008 | Brown |
| 2008/0201265 A1 | 8/2008 | Hewton |
| 2008/0228646 A1 | 9/2008 | Myers |
| 2008/0243702 A1 | 10/2008 | Hart |
| 2008/0245855 A1 | 10/2008 | Fein |
| 2008/0245861 A1 | 10/2008 | Fein |
| 2008/0283591 A1 | 11/2008 | Oder, II |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown |
| 2009/0010488 A1 | 1/2009 | Matsuoka |
| 2009/0037333 A1 | 2/2009 | Flitcroft |
| 2009/0037388 A1 | 2/2009 | Cooper |
| 2009/0043702 A1 | 2/2009 | Bennett |
| 2009/0048971 A1 | 2/2009 | Hathaway |
| 2009/0106112 A1 | 4/2009 | Dalmia |
| 2009/0106160 A1 | 4/2009 | Skowronek |
| 2009/0134217 A1 | 5/2009 | Flitcroft |
| 2009/0157555 A1 | 6/2009 | Biffle |

(56) References Cited

U.S. PATENT DOCUMENTS

| | | |
|---|---|---|
| 2009/0159673 A1 | 6/2009 | Mullen |
| 2009/0159700 A1 | 6/2009 | Mullen |
| 2009/0159707 A1 | 6/2009 | Mullen |
| 2009/0173782 A1 | 7/2009 | Muscato |
| 2009/0200371 A1 | 8/2009 | Kean |
| 2009/0248583 A1 | 10/2009 | Chhabra |
| 2009/0276347 A1 | 11/2009 | Kargman |
| 2009/0281948 A1 | 11/2009 | Carlson |
| 2009/0294527 A1 | 12/2009 | Brabson |
| 2009/0307139 A1 | 12/2009 | Mardikar |
| 2009/0308921 A1 | 12/2009 | Mullen |
| 2009/0327131 A1 | 12/2009 | Beenau |
| 2010/0008535 A1 | 1/2010 | Abulafia |
| 2010/0042848 A1* | 2/2010 | Rosener .............. G06F 21/32 713/184 |
| 2010/0088237 A1 | 4/2010 | Wankmueller |
| 2010/0094755 A1 | 4/2010 | Kloster |
| 2010/0106644 A1 | 4/2010 | Annan |
| 2010/0120408 A1 | 5/2010 | Beenau |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0185545 A1 | 7/2010 | Royyuru |
| 2010/0211505 A1 | 8/2010 | Saunders |
| 2010/0223186 A1 | 9/2010 | Hogan |
| 2010/0228668 A1 | 9/2010 | Hogan |
| 2010/0235284 A1 | 9/2010 | Moore |
| 2010/0258620 A1 | 10/2010 | Torreyson |
| 2010/0291904 A1 | 11/2010 | Musfeldt |
| 2010/0299267 A1 | 11/2010 | Faith et al. |
| 2010/0306076 A1 | 12/2010 | Taveau |
| 2010/0325041 A1 | 12/2010 | Berardi |
| 2011/0010292 A1 | 1/2011 | Giordano |
| 2011/0016047 A1 | 1/2011 | Wu |
| 2011/0016320 A1 | 1/2011 | Bergsten |
| 2011/0040640 A1 | 2/2011 | Erikson |
| 2011/0047076 A1 | 2/2011 | Carlson et al. |
| 2011/0083018 A1 | 4/2011 | Kesanupalli |
| 2011/0087596 A1 | 4/2011 | Dorsey |
| 2011/0093397 A1 | 4/2011 | Carlson |
| 2011/0119155 A1 | 5/2011 | Hammad et al. |
| 2011/0125597 A1 | 5/2011 | Oder, II |
| 2011/0153437 A1 | 6/2011 | Archer |
| 2011/0153498 A1 | 6/2011 | Makhotin et al. |
| 2011/0154466 A1 | 6/2011 | Harper |
| 2011/0161233 A1 | 6/2011 | Tieken |
| 2011/0178926 A1 | 7/2011 | Lindelsee et al. |
| 2011/0191244 A1 | 8/2011 | Dai |
| 2011/0238511 A1 | 9/2011 | Park |
| 2011/0238573 A1 | 9/2011 | Varadarajan |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen |
| 2011/0276381 A1 | 11/2011 | Mullen |
| 2011/0276424 A1 | 11/2011 | Mullen |
| 2011/0276425 A1 | 11/2011 | Mullen |
| 2011/0295745 A1 | 12/2011 | White |
| 2011/0302081 A1 | 12/2011 | Saunders |
| 2012/0023567 A1 | 1/2012 | Hammad |
| 2012/0028609 A1 | 2/2012 | Hruska |
| 2012/0030047 A1 | 2/2012 | Fuentes et al. |
| 2012/0035998 A1 | 2/2012 | Chien |
| 2012/0041881 A1 | 2/2012 | Basu |
| 2012/0047237 A1 | 2/2012 | Arvidsson |
| 2012/0066078 A1 | 3/2012 | Kingston |
| 2012/0072350 A1 | 3/2012 | Goldthwaite |
| 2012/0078735 A1 | 3/2012 | Bauer |
| 2012/0078798 A1 | 3/2012 | Downing |
| 2012/0078799 A1 | 3/2012 | Jackson |
| 2012/0095852 A1 | 4/2012 | Bauer |
| 2012/0095865 A1 | 4/2012 | Doherty |
| 2012/0116902 A1 | 5/2012 | Cardina |
| 2012/0123882 A1 | 5/2012 | Carlson |
| 2012/0123940 A1 | 5/2012 | Killian |
| 2012/0129514 A1 | 5/2012 | Beenau |
| 2012/0143754 A1 | 6/2012 | Patel |
| 2012/0143767 A1 | 6/2012 | Abadir |
| 2012/0143772 A1 | 6/2012 | Abadir |
| 2012/0158580 A1 | 6/2012 | Eram |
| 2012/0158593 A1 | 6/2012 | Garfinkle |
| 2012/0173431 A1 | 7/2012 | Ritchie |
| 2012/0185386 A1 | 7/2012 | Salama |
| 2012/0197807 A1 | 8/2012 | Schlesser |
| 2012/0203664 A1 | 8/2012 | Torossian |
| 2012/0203666 A1 | 8/2012 | Torossian |
| 2012/0215688 A1 | 8/2012 | Musser |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain |
| 2012/0246079 A1 | 9/2012 | Wilson et al. |
| 2012/0265631 A1 | 10/2012 | Cronic |
| 2012/0271770 A1 | 10/2012 | Harris |
| 2012/0297446 A1 | 11/2012 | Webb |
| 2012/0300932 A1 | 11/2012 | Cambridge |
| 2012/0303503 A1 | 11/2012 | Cambridge |
| 2012/0303961 A1 | 11/2012 | Kean |
| 2012/0304273 A1 | 11/2012 | Bailey |
| 2012/0310725 A1 | 12/2012 | Chien |
| 2012/0310831 A1 | 12/2012 | Harris |
| 2012/0316992 A1 | 12/2012 | Oborne |
| 2012/0317035 A1 | 12/2012 | Royyuru |
| 2012/0317036 A1 | 12/2012 | Bower |
| 2013/0017784 A1 | 1/2013 | Fisher |
| 2013/0018757 A1 | 1/2013 | Anderson et al. |
| 2013/0019098 A1 | 1/2013 | Gupta |
| 2013/0031006 A1 | 1/2013 | Mccullagh et al. |
| 2013/0054337 A1 | 2/2013 | Brendell |
| 2013/0054466 A1 | 2/2013 | Muscato |
| 2013/0054474 A1 | 2/2013 | Yeager |
| 2013/0081122 A1 | 3/2013 | Svigals |
| 2013/0091028 A1 | 4/2013 | Oder, II |
| 2013/0110658 A1 | 5/2013 | Lyman |
| 2013/0111599 A1 | 5/2013 | Gargiulo |
| 2013/0117185 A1 | 5/2013 | Collison |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith |
| 2013/0145148 A1 | 6/2013 | Shablygin |
| 2013/0145172 A1 | 6/2013 | Shablygin |
| 2013/0159178 A1 | 6/2013 | Colon |
| 2013/0159184 A1 | 6/2013 | Thaw |
| 2013/0166402 A1 | 6/2013 | Parento |
| 2013/0166456 A1 | 6/2013 | Zhang |
| 2013/0173736 A1 | 7/2013 | Krzeminski |
| 2013/0185202 A1 | 7/2013 | Goldthwaite |
| 2013/0191227 A1 | 7/2013 | Pasa et al. |
| 2013/0191286 A1 | 7/2013 | Cronic |
| 2013/0191289 A1 | 7/2013 | Cronic |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge |
| 2013/0212007 A1 | 8/2013 | Mattsson |
| 2013/0212017 A1 | 8/2013 | Bangia |
| 2013/0212019 A1 | 8/2013 | Mattsson |
| 2013/0212024 A1 | 8/2013 | Mattsson |
| 2013/0212026 A1 | 8/2013 | Powell et al. |
| 2013/0212666 A1 | 8/2013 | Mattsson |
| 2013/0218698 A1 | 8/2013 | Moon |
| 2013/0218769 A1 | 8/2013 | Pourfallah et al. |
| 2013/0226799 A1 | 8/2013 | Raj |
| 2013/0226802 A1 | 8/2013 | Hammad |
| 2013/0226813 A1 | 8/2013 | Voltz |
| 2013/0246199 A1 | 9/2013 | Carlson |

(56) References Cited

U.S. PATENT DOCUMENTS

| | | |
|---|---|---|
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru |
| 2013/0254102 A1 | 9/2013 | Royyuru |
| 2013/0254117 A1 | 9/2013 | Von Mueller |
| 2013/0262296 A1 | 10/2013 | Thomas |
| 2013/0262302 A1 | 10/2013 | Lettow |
| 2013/0262315 A1 | 10/2013 | Hruska |
| 2013/0262316 A1 | 10/2013 | Hruska |
| 2013/0262317 A1 | 10/2013 | Collinge |
| 2013/0275300 A1 | 10/2013 | Killian |
| 2013/0275307 A1 | 10/2013 | Khan |
| 2013/0275308 A1 | 10/2013 | Paraskeva |
| 2013/0282502 A1 | 10/2013 | Jooste |
| 2013/0282575 A1 | 10/2013 | Mullen |
| 2013/0282588 A1 | 10/2013 | Hruska |
| 2013/0297501 A1 | 11/2013 | Monk et al. |
| 2013/0297504 A1 | 11/2013 | Nwokolo |
| 2013/0297508 A1 | 11/2013 | Belamant |
| 2013/0304649 A1 | 11/2013 | Cronic |
| 2013/0308778 A1 | 11/2013 | Fosmark |
| 2013/0311382 A1 | 11/2013 | Fosmark |
| 2013/0317982 A1 | 11/2013 | Mengerink |
| 2013/0332344 A1 | 12/2013 | Weber |
| 2013/0339253 A1 | 12/2013 | Sincai |
| 2013/0346305 A1 | 12/2013 | Mendes |
| 2013/0346314 A1 | 12/2013 | Mogollon |
| 2014/0007213 A1 | 1/2014 | Sanin |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson |
| 2014/0040139 A1 | 2/2014 | Brudnicki |
| 2014/0040144 A1 | 2/2014 | Plomske |
| 2014/0040145 A1 | 2/2014 | Ozvat |
| 2014/0040148 A1 | 2/2014 | Ozvat |
| 2014/0040628 A1 | 2/2014 | Fort |
| 2014/0041018 A1 | 2/2014 | Bomar |
| 2014/0046853 A1 | 2/2014 | Spies |
| 2014/0047551 A1 | 2/2014 | Nagasundaram et al. |
| 2014/0052532 A1 | 2/2014 | Tsai |
| 2014/0052620 A1 | 2/2014 | Rogers |
| 2014/0052637 A1 | 2/2014 | Jooste |
| 2014/0068706 A1 | 3/2014 | Aissi |
| 2014/0074637 A1 | 3/2014 | Hammad |
| 2014/0108172 A1 | 4/2014 | Weber et al. |
| 2014/0114857 A1 | 4/2014 | Griggs et al. |
| 2014/0143137 A1 | 5/2014 | Carlson |
| 2014/0164243 A1 | 6/2014 | Aabye et al. |
| 2014/0188586 A1 | 7/2014 | Carpenter et al. |
| 2014/0249945 A1 | 9/2014 | Gauthier |
| 2014/0289528 A1* | 9/2014 | Baghdasaryan ........ G06F 21/32 713/171 |
| 2014/0289833 A1* | 9/2014 | Briceno ................. H04L 63/08 726/7 |
| 2014/0294701 A1 | 10/2014 | Dai et al. |
| 2014/0297534 A1 | 10/2014 | Patterson |
| 2014/0310183 A1 | 10/2014 | Weber |
| 2014/0324690 A1 | 10/2014 | Allen et al. |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0372308 A1 | 12/2014 | Sheets |
| 2015/0019443 A1 | 1/2015 | Sheets et al. |
| 2015/0032625 A1 | 1/2015 | Dill |
| 2015/0032626 A1 | 1/2015 | Dill |
| 2015/0032627 A1 | 1/2015 | Dill |
| 2015/0046338 A1 | 2/2015 | Laxminarayanan |
| 2015/0046339 A1 | 2/2015 | Wong et al. |
| 2015/0052064 A1 | 2/2015 | Karpenko et al. |
| 2015/0081544 A1 | 3/2015 | Wong et al. |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0269566 A1 | 9/2015 | Gaddam et al. |
| 2015/0278799 A1 | 10/2015 | Palanisamy |
| 2015/0287037 A1 | 10/2015 | Salmon |
| 2015/0312038 A1 | 10/2015 | Palanisamy |
| 2015/0319158 A1 | 11/2015 | Kumnick |
| 2015/0324736 A1 | 11/2015 | Sheets |
| 2015/0326559 A1* | 11/2015 | Kuang .................... G06F 21/34 726/5 |
| 2015/0332262 A1 | 11/2015 | Lingappa |
| 2015/0356560 A1 | 12/2015 | Shastry et al. |
| 2015/0363775 A1 | 12/2015 | Li |
| 2015/0363781 A1 | 12/2015 | Badenhorst |
| 2016/0028550 A1 | 1/2016 | Gaddam et al. |
| 2016/0036790 A1 | 2/2016 | Shastry et al. |
| 2016/0042263 A1 | 2/2016 | Gaddam et al. |
| 2016/0065370 A1 | 3/2016 | Le Saint et al. |
| 2016/0092696 A1 | 3/2016 | Guglani et al. |
| 2016/0092872 A1 | 3/2016 | Prakash et al. |
| 2016/0092874 A1 | 3/2016 | O'Regan |
| 2016/0103675 A1 | 4/2016 | Aabye et al. |
| 2016/0119296 A1 | 4/2016 | Laxminarayanan et al. |
| 2016/0132878 A1 | 5/2016 | O'Regan |
| 2016/0140545 A1 | 5/2016 | Flurscheim et al. |
| 2016/0148197 A1 | 5/2016 | Dimmick |
| 2016/0148212 A1 | 5/2016 | Dimmick |
| 2016/0171479 A1 | 6/2016 | Prakash et al. |
| 2016/0173483 A1 | 6/2016 | Wong et al. |
| 2016/0197725 A1 | 7/2016 | Hammad |
| 2016/0210628 A1 | 7/2016 | McGuire |
| 2016/0217461 A1 | 7/2016 | Gaddam |
| 2016/0218875 A1 | 7/2016 | Le Saint et al. |
| 2016/0224976 A1 | 8/2016 | Basu |
| 2016/0224977 A1 | 8/2016 | Sabba et al. |
| 2016/0232527 A1 | 8/2016 | Patterson |
| 2016/0239842 A1 | 8/2016 | Cash et al. |
| 2016/0269391 A1 | 9/2016 | Gaddam et al. |
| 2016/0308995 A1 | 10/2016 | Youdale et al. |
| 2016/0350748 A1 | 12/2016 | Pruthi et al. |
| 2017/0046696 A1 | 2/2017 | Powell et al. |
| 2017/0076288 A1 | 3/2017 | Awasthi |
| 2017/0103387 A1 | 4/2017 | Weber |
| 2017/0109745 A1 | 4/2017 | Al-Bedaiwi |
| 2017/0148013 A1 | 5/2017 | Rajurkar |
| 2017/0163617 A1 | 6/2017 | Narayan |
| 2017/0163629 A1 | 6/2017 | Law |
| 2017/0186001 A1 | 6/2017 | Reed et al. |
| 2017/0200156 A1 | 7/2017 | Karpenko |
| 2017/0200165 A1 | 7/2017 | Narayan |
| 2017/0201520 A1 | 7/2017 | Chandoor |
| 2017/0220818 A1 | 8/2017 | Nagasundaram et al. |
| 2017/0221054 A1 | 8/2017 | Flurscheim |
| 2017/0221056 A1 | 8/2017 | Karpenko |

(56) References Cited

U.S. PATENT DOCUMENTS

| | | |
|---|---|---|
| 2017/0228723 A1 | 8/2017 | Taylor |
| 2017/0228728 A1 | 8/2017 | Sullivan |
| 2017/0236113 A1 | 8/2017 | Chitalia |
| 2017/0293914 A1 | 10/2017 | Girish |
| 2017/0295155 A1 | 10/2017 | Wong et al. |
| 2017/0337549 A1 | 11/2017 | Wong |
| 2017/0344732 A1 | 11/2017 | Kohli |
| 2017/0364903 A1 | 12/2017 | Lopez |
| 2017/0364914 A1 | 12/2017 | Howard |
| 2017/0373852 A1 | 12/2017 | Cassin |
| 2018/0006821 A1 | 1/2018 | Kinagi |
| 2018/0047023 A1* | 2/2018 | Bouda ............... G06Q 20/3226 |
| 2018/0075081 A1 | 3/2018 | Chipman |
| 2018/0247303 A1 | 8/2018 | Raj |
| 2018/0262334 A1 | 9/2018 | Hammad |
| 2018/0268399 A1 | 9/2018 | Spector |
| 2018/0268405 A1 | 9/2018 | Lopez |
| 2018/0285875 A1 | 10/2018 | Law |
| 2018/0324184 A1 | 11/2018 | Kaja |
| 2018/0324584 A1 | 11/2018 | Lopez |
| 2019/0020478 A1 | 1/2019 | Girish |
| 2019/0066069 A1 | 2/2019 | Faith |
| 2019/0147439 A1 | 5/2019 | Wang |
| 2019/0356489 A1 | 11/2019 | Palanismy |
| 2019/0384896 A1 | 12/2019 | Jones |
| 2019/0392431 A1 | 12/2019 | Chitalila |
| 2020/0267153 A1 | 8/2020 | Kang |

FOREIGN PATENT DOCUMENTS

| | | |
|---|---|---|
| WO | 2000/014648 A1 | 3/2000 |
| WO | 2001035304 A1 | 5/2001 |
| WO | 2001035304 A9 | 5/2001 |
| WO | 2004/051585 A2 | 11/2003 |
| WO | 2004042536 A2 | 5/2004 |
| WO | 2005/001751 A1 | 6/2004 |
| WO | 2006113834 A2 | 10/2006 |
| WO | 2009032523 A1 | 3/2009 |
| WO | 2010078522 A1 | 7/2010 |
| WO | 2012068078 A2 | 5/2012 |
| WO | 2012098556 A1 | 7/2012 |
| WO | 2012142370 A2 | 10/2012 |
| WO | 2012167941 A1 | 12/2012 |
| WO | 2013048538 A1 | 4/2013 |
| WO | 2013056104 A1 | 4/2013 |
| WO | 2013119914 A1 | 8/2013 |
| WO | 2013179271 A2 | 12/2013 |

OTHER PUBLICATIONS

Petition for Inter Partes Review of U.S. Pat. No. 8,533,860 Challenging Claims 1-30 Under 35 U.S.C. § 312 and 37 C.F.R. § 42.104, filed Feb. 17, 2016, Before the USPTO Patent Trial and Appeal Board, IPR 2016-00600, 65 pages.

Dean, et al., U.S. Appl. No. 16/311,144 (unpublished), "Encryption Key Exchange Process Using Access Device," filed Dec. 18, 2018.

EP18909101.0 , "Extended European Search Report", dated Mar. 18, 2021, 9 pages.

* cited by examiner

SECURE REMOTE TOKEN RELEASE WITH ONLINE AUTHENTICATION

CROSS-REFERENCES TO RELATED APPLICATIONS

This application is a National Stage of International Application No. PCT/IB2018/056173, International Filing Date Aug. 16, 2018, which claims the benefit of and priority to U.S. Provisional Patent Application No. 62/639,652, entitled, "SECURE REMOTE TOKEN RELEASE WITH ONLINE AUTHENTICATION," filed Mar. 7, 2018, which are all fully incorporated by reference herein.

BACKGROUND

With the ever growing number of online or computer accessible accounts that a user may have, usernames and passwords as a form of authentication has become inadequate for securing a user's accounts. For example, remembering usernames and passwords for numerous sites can be challenging, and setting the same password for multiple accounts may increase the likelihood of jeopardizing all accounts when one account is compromised. Password managers can be inconvenient, and storing all of the user's passwords in one place can be risky. Passwords can also be easily phished or captured by malware, and data breaches at service providers can result in the proliferation of passwords across the dark web.

Furthermore, while authorization entities are able to determine whether or not to authorize a transaction based on information for an account, those same authorization entities are not able to authenticate a user of a user device. Hence, they must often rely on another entity, such as the resource provider, to perform authentication of a user. Not all resource providers can provide the same quality of authentication, and this leads to data security problems.

Another issue to be addressed in the area of data security that needs to be addressed, if the problem of transmitting sensitive credentials (e.g., social security numbers, account numbers, etc.) over data networks. The transmission of such data may be subject to man-in-the middle attacks.

Various embodiments of the invention address these and other problems, individually and collectively.

SUMMARY

A system and techniques for authenticating a user while ensuring that the authentication was performed by a legitimate device is described herein. The authentication technique may include registering a user's authentication data such as biometrics data with a communication device. The authentication data can be linked to an account or service provider, and is used to verify the identity of the user when accessing the account. The communication device may be associated with a public/private key pair, where the pubic key is stored on a secure remote server. When the user attempts to access the account or service provider, the user may provide the authentication data to authenticate the user to the communication device. Thereafter, the communication device may sign an authentication indicator using the private key and send the authentication indicator to the secure remote server. Upon verification of the signature using the public key, the secure remote server may grant access to the user, for example, by releasing a token.

One embodiment of the disclosure is directed to a method performed by a secure remote transaction server comprising receiving, from a client device, a request to enroll an account, verifying that the client device has authority to access the account, storing at least a public key of a cryptographic key pair in association with the account, wherein at least a private key of the cryptographic key pair is stored on the client device in association with the account, and generating a token to be associated with the account, the token being stored in association with the account. In some embodiments, the method may further comprise receiving, from an access device, a request to complete a transaction in association with the account, the request including a signed authentication indicator, verifying the authentication indicator using the public key stored in association with the account, and upon verifying the authentication indicator, providing the token to the access device.

Another embodiment of the disclosure is directed to a secure remote transaction server comprising a processor, and a memory including instructions that, when executed with the processor, cause the secure remote transaction server to, at least receive, from a client device, a request to enroll an account, verify that the client device has authority to access the account, store at least a public key of a cryptographic key pair in association with the account, wherein at least a private key of the cryptographic key pair is stored on the client device in association with the account, and generate a token to be associated with the account, the token being stored in association with the account. In some embodiments, the instructions may further cause the secure remote transaction server to receive, from an access device, a request to complete a transaction in association with the account, the request including a signed authentication indicator, verify the authentication indicator using the public key stored in association with the account, and upon verifying the authentication indicator, provide the token to the access device.

Yet another embodiment of the disclosure is directed to a method performed by a communication device comprising receiving a request to register authentication data for an account associated with a service provider, prompting the user to provide the authentication data, receiving the authentication data from the user, registering the authentication data onto the communication device, obtaining a private key of a cryptographic key pair, associating the private key with the account and the authentication data, wherein a secure remote server links a public key of the cryptographic key pair to a token associated with the account.

In some embodiments, the method described above may further comprise receiving a request to access the account, prompting the user to provide the authentication data, receiving the authentication data from the user, comparing the received authentication data with the registered authentication data, determining that the received authentication data matches the registered authentication data, generating an authentication indicator indicating the match, signing the authentication indicator using the private key, and sending the signed authentication indicator to the secure remote server in an access request, wherein the secure remote server releases the token to the service provider to grant the user access to the account in response to verifying the signed authentication indicator using the public key.

Further details regarding embodiments of the invention can be found in the Detailed Description and the Figures.

DETAILED DESCRIPTION

Figure 1:
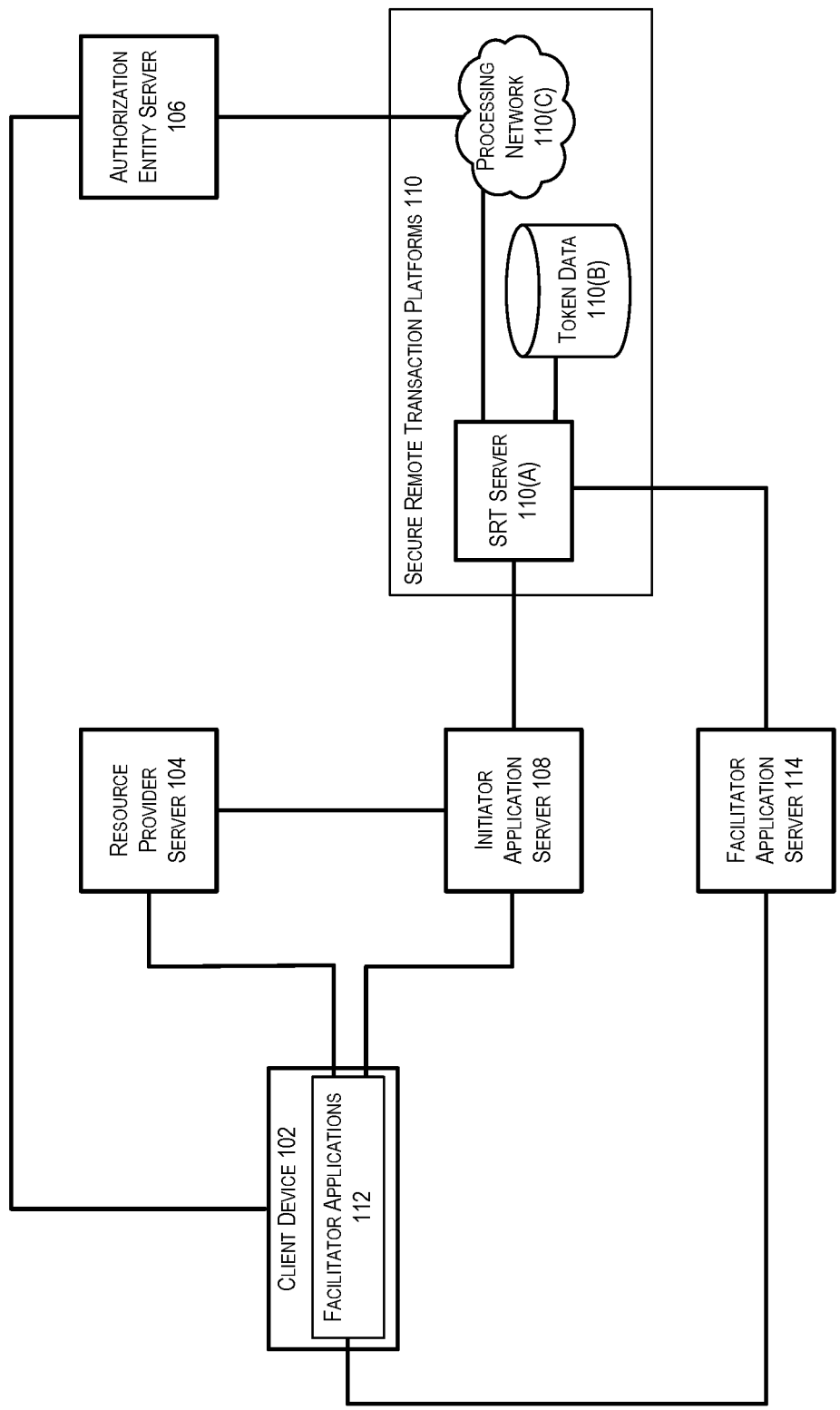
FIG. 1 depicts a number of components that may be involved in a system used to implement at least some embodiments of the disclosure.

Techniques for enhanced authentication without relying on the use of passwords are described. In some embodiments, a two-factor authentication scheme can be employed in which biometrics is used to authenticate a user on a communication device, and public/private key cryptography is used to authenticate the communication device to a remote server to grant the user access to an account, service, and/or function associated with a service provider. In some embodiments, the service provider can be a token service provider, and the two-factor authentication scheme is used by the system to release a token from the remote server. The token can then be used, for example, to conduct a transaction using the user's account. Various embodiments described herein may be implemented on a secure remote transaction (SRT) platform. An example of an SRT platform upon which embodiments may be implemented is described in greater detail in U.S. patent application Ser. No. 15/927,754, filed on Mar. 21, 2018, which is fully incorporated by reference herein.

Prior to discussing specific embodiments of the invention, some terms may be described in detail.

An "access device" may be any suitable device for communicating with a merchant computer or transaction processing network, and for interacting with a transaction device (e.g., a payment device), a user computer apparatus, and/or a user client device. An access device may generally be located in any suitable location, such as at the location of a merchant. An access device may be in any suitable form. Some examples of access devices include POS devices, cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, Websites, and the like. An access device may use any suitable contact or contactless mode of operation to send or receive data from, or associated with, a portable communication device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a portable communication device.

"Account credentials" may include any suitable information associated with an account (e.g. an account and/or portable device associated with the account). Such information may be directly related to the account or may be derived from information related to the account. Examples of account credentials may include a PAN (primary account number or "account number"), user name, expiration date, CVV (card verification value), dCVV (dynamic card verification value), CVV2 (card verification value 2), CVC3 card verification values, etc.

An "acquirer" may typically be a business entity (e.g., a commercial bank) that has a business relationship with a particular merchant or other entity. Some entities can perform both issuer and acquirer functions. Some embodiments may encompass such single entity issuer-acquirers.

"Authentication" or "authenticating" may be the process of proving or verifying certain information, and/or verifying the identity of the source of that information. For example, a user may provide authentication data that is unique or only known to the user to prove the identity of the user. Examples of different types of authentication data may include biometrics (e.g., fingerprint, palm print, face recognition, iris and/or retina recognition, voice recognition, gait, or other human characteristics), passcode, PIN, answers to security question(s), cryptographic response to challenge, human and/or device signature, etc.

An "authorization entity" may be an entity that authorizes a request. Examples of an authorization entity may be an issuer, a governmental agency, a document repository, an access administrator, etc. An "issuer" may typically refer to a business entity (e.g., a bank) that maintains an account for a user that is associated with a client device such as an account enrolled in a mobile application installed on a client device. An authorization entity may also issue account parameters associated with the account to a client device. An authorization entity may be associated with a host system that performs some or all of the functions of the issuer on behalf of the authorization entity.

An "authorization request message" may be an electronic message that is sent to request authorization for a transaction. The authorization request message can be sent to a transaction processing network and/or an issuer of a transaction card (e.g., a payment card). An authorization request message according to some embodiments may comply with ISO 8583, which is a standard for systems that exchange electronic transaction information associated with a transaction made by a user using a transaction device or transaction account. The authorization request message may include information that can be used to identify an account. An authorization request message may also comprise additional data elements such as one or more of a service code, an expiration date, etc. An authorization request message may also comprise transaction information, such as any information associated with a current transaction, such as the transaction amount, merchant identifier, merchant location, etc., as well as any other information that may be utilized in determining whether to identify and/or authorize a transaction. The authorization request message may also include other information such as information that identifies the access device that generated the authorization request message, information about the location of the access device, etc.

An "authorization response message" may be an electronic message reply to an authorization request message. The authorization response message can be generated by an issuing financial institution or a transaction processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing network) to the merchant computer that indicates approval of the transaction. The code may serve as proof of authorization. As noted above, in some embodiments, a transaction processing network may generate or forward the authorization response message to the merchant.

A "communication device" may be a device that includes one or more electronic components (e.g., an integrated chip) that can communicate with another device or entity. For example, a communication device can be a computing device that includes at least one processor coupled to a memory that stores instructions or code for execution by the processor, and may include a communication interface that allows the communication device to interact with other entities. A communication device can be a portable communication device that can be transported and operated by a user, and may include one or more electronic components (e.g., an integrated chip). A portable communication device may provide remote communication capabilities to a network. The portable communication device can be configured to transmit and receive data or communications to and from other devices. A portable communication device may be in the form of a client device such as a mobile phone (e.g., smart phone, cellular phone, etc.), tablets, portable media player, personal digital assistant devices (PDAs), wearable device (e.g., watch, health monitoring device such as a fitness tracker, etc.), electronic reader device, etc., or in the form of a card (e.g., smart card) or a fob, etc. Examples of portable communication devices may also include portable computing devices (e.g., laptops, netbooks, ultrabooks, etc.). A portable communication device may also be in the form of a vehicle (e.g., an automobile), or be integrated as part of a vehicle (e.g., an infosystem of a vehicle). Other examples of communication device may include IOT devices, smart appliances and electronics, etc.

A "facilitator" may be any entity capable of authenticating a user of a client device. A facilitator may include a client-side application (e.g., a facilitator application) as well as a backend server (e.g., a facilitator server) capable of supporting the client-side application. In some cases, a facilitator application may be executed upon receiving instructions from a facilitator server to authenticate a user of the client device. The facilitator application may cause the client device upon which it is installed to obtain user-specific data. This user-specific data may then be compared to expected user-specific data, either by the facilitator application on the client device or by the facilitator server, to determine whether the obtained user-specific data matches the expected user-specific data. In some embodiments, a facilitator may be an electronic wallet provider (e.g., Apple Pay). It should be noted that the facilitator may be unaffiliated with the SRT Platform and/or the initiator.

An "initiator" may be any entity capable of facilitating communication between a resource provider and one or more SRT platforms. An initiator may operate a number of servers which provide at least a portion of the functionality described herein. In some cases, an initiator may obtain approval and/or accreditation from one or more SRT platforms in order to operate in conjunction with those SRT platforms. A resource provider may enroll with the initiator in order to obtain access to at least a portion of the processes described herein. An initiator may provide each resource provider that enrolls with it a link to embed within a checkout element. The link, when activated by a user wishing to transact with the resource provider, may initiate the processes described herein in order to facilitate a transaction between the user and the resource provider. It should be noted that the initiator may be unaffiliated with the SRT Platform and/or the facilitator.

An "issuer" may typically refer to a business entity (e.g., a bank) that maintains an account for a user that is associated with a portable communication device such as an account enrolled in a mobile application installed on a portable communication device. An issuer may also issue account parameters associated with the account to a portable communication device. An issuer may be associated with a host system that performs some or all of the functions of the issuer on behalf of the issuer.

A "key" may refer to a piece of information that is used in a cryptographic algorithm to transform input data into another representation. A cryptographic algorithm can be an encryption algorithm that transforms original data into an alternate representation, or a decryption algorithm that transforms encrypted information back to the original data. Examples of cryptographic algorithms may include triple data encryption standard (TDES), data encryption standard (DES), advanced encryption standard (AES), etc.

A "merchant" may typically be an entity that engages in transactions and can sell goods or services, or provide access to goods or services.

A "real account identifier" may refer to an original account identifier associated with an account. For example, a real account identifier may be a primary account number (PAN) issued by an issuer for a card account (e.g., credit card, debit card, etc.). For instance, in some embodiments, a real account identifier may include a sixteen digit numerical value such as "4147 0900 0000 1234." The first six digits of the real account identifier (e.g., "414709"), may represent a real issuer identifier (BIN) that may identify an issuer associated with the real account identifier.

The term "resource" generally refers to any asset that may be used or consumed. For example, the resource may be computer resource (e.g., stored data or a networked computer account), a physical resource (e.g., a tangible object or a physical location), or other electronic resource or communication between computers (e.g., a communication signal corresponding to an account for performing a transaction). Some non-limiting examples of a resource may be a good or service, a physical building, a computer account or file, or a payment account. In some embodiments, a resource may refer to a financial product, such as a loan or line of credit.

A "resource provider" may be an entity that can provide a resource such as goods, services, information, and/or access to such a resource. Examples of a resource provider include merchants, online or other electronic retailers, access devices, secure data access points, etc. A "merchant" may typically be an entity that engages in transactions and can sell goods or services, or provide access to goods or services. A "resource provider computer" may be any computing device operated by a resource provider.

A "secure remote transaction (SRT) platform" may be any entity capable of facilitating a transaction in the manners described. A SRT platform may be capable of communicating with an initiator, a facilitator, and a transaction processing network. In some embodiments, a SRT platform may include a SRT server, a token provider, and a transaction processing network. An SRT platform may be configured to perform one or more processes that include: receive a request for a transaction from an initiator, identify an account associated with the transaction, determine an appropriate facilitator for the account, cause the determined facilitator to authenticate a user associated with the account, generate a token to be used in the transaction, and provide the token to the initiator to complete the transaction.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

A "token" may refer to a substitute identifier for some information. For example, a transaction token may include an identifier for a transaction account that is a substitute for an account identifier, such as a primary account number (PAN). For instance, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be a random string of characters. In some embodiments, a token may be used in place of a PAN to initiate, authorize, settle or resolve a transaction. The token may also be used to represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

"Tokenization" may refer to a process by which data is replaced with substitute data. For example, an account identifier (e.g., a primary account number (PAN)) may be tokenized by replacing the account identifier with a substitute number (e.g., a token) that is associated with the account identifier. Further, tokenization may be applied to other information which may be replaced with a substitute value. Tokenization may be used to enhance transaction efficiency, improve transaction security, increase service transparency, or to provide a method for third-party enablement.

A "token service provider" may refer to an entity including one or more server computers that generates, processes, and/or maintains tokens. A token service provider may include or be in communication with a token vault where the generated tokens are stored. Specifically, the token vault may maintain one-to-one mapping between a token and the data (e.g., a real account identifier) represented by the token. A token service provider may provide reports or data output to reporting tools regarding approved, pending, and/or declined token requests. The token service provider may provide data output related to token-based transactions to reporting tools and applications and present the token and/or the data substituted by the token (e.g., real account identifiers) as appropriate in the reporting output.

A "token vault" may refer to a repository that maintains established token-to-PAN mappings. According to various embodiments, the token vault may also maintain other attributes of the token requestor that may be determined at the time of registration and that may be used by the token SRT server to apply domain restrictions or other controls during transaction processing. The token vault may be a part of the token service system. In some embodiments, the token vault may be provided as a part of the token SRT server. Alternatively, the token vault may be a remote repository accessible by the token SRT server. Token vaults, due to the sensitive nature of the data mappings that are stored and managed in them, may be protected by strong underlying physical and logical security.

A "transaction" may be any interaction or exchange between two or more parties. For example, a transaction may include a first entity requesting resources from a second entity. In this example, the transaction is completed when the resources are either provided to the first entity or the transaction is declined.

A "transaction processing network," or "processing network," may refer to an electronic payment system used to accept, transmit, or process transactions made by payment devices for money, goods, or services. The processing network may transfer information and funds among authorization entities (e.g., issuers), acquirers, merchants, and payment device users.

FIG. 1 depicts a number of components that may be involved in a system used to implement at least some embodiments of the disclosure. In FIG. 1, a client device 102 may be in communication with a number of remote entities via a network connection (either wireless or physical). For example, the client device 102 may be used to access a website maintained by a resource provider server 104 or an authorization entity server 106 (e.g., via a browser application). In this example, the website may have embedded a checkout element configured to cause the client device 102 to initiate communication with a initiator server 108. The initiator server 108 may, in turn, be in communication with a secure remote transaction (SRT) platform 110.

In some embodiments, the client device 102 may have installed on it a number of facilitator applications 112. The facilitator applications may be configured to cause the client device 102 to communicate with a number of facilitator application servers 114 in order to authenticate a user of the client device 102. In some embodiments, the client device 102 may store, in its memory, one or more cryptographic keys to be associated with facilitators installed on the client device 102 and/or the client device 102 itself.

In some embodiments of the invention, the client device 102 may be a mobile device (e.g. a mobile phone). The mobile device may be capable of communicating with cell towers (e.g., via cellular communications such as GSM, LTE, 4G) and wireless routers (e.g., via WiFi). The mobile device may store the user's account credentials, such as a PAN (primary account number), a token, a name, an address, a CVV, an expiration date, and any other suitable information. The mobile device may also store one or more private cryptographic keys associated with the mobile device itself or applications installed upon the mobile device. Such data may be securely stored via hardware (e.g., a secure element) or software.

In some embodiments, the resource provider server 104 may be affiliated with an online retailer or another suitable resource provider having an electronic catalog. The resource provider server 104 may serve one or more pages of a resource provider website to a browser installed on the client device 102. In some embodiments, the website served to the browser application may contain a portal or link that, when accessed using the browser application, initiates communication with the initiator server 108.

In some embodiments of the invention, the authorization entity server 106 may be any computing device configured to determine whether or not to approve a transaction to be conducted by a particular user. The authorization entity server 106 may maintain a number of accounts, one or more of which are associated with particular users. Each account may be associated with some amount of a resource (e.g., a balance) upon which authorization for a transaction may be based. However, while an authorization entity server 106 may be capable of determining whether or not to authorize a transaction for a user, the authorization entity server 106 may not be capable of authenticating a user as it is located remote to that user. Hence, the authorization entity server 106 may be configured to use embodiments of the system described herein to authenticate a user. In some embodiments, upon successful enrollment of a user into the system described herein, the authorization entity server 106 may generate a token to be associated with the user and may provide the token to the SRT platform 110 to be bound to a client device 102 along with a pair of cryptographic keys.

The initiator server 108 may be any suitable computing device configured to identify a user, identify accounts for that user, receive a selection of one of those accounts, communicate the selected account to an SRT platform 110 associated with that account, and complete a transaction using the selected account. In some embodiments, the initiator server 108 may be further configured to verify signed data received from the client device 102. For example, the initiator server may, upon receiving data from the client device 102, verify that data using a public cryptographic key associated with the client device 102 or an application installed upon the client device 102.

In some embodiments, the system may be implemented across one or more SRT platforms 110. The SRT platforms may each be associated with a transaction processing network. Each SRT platform may include some combination of an SRT server (or servers) 110(A), token data 110(B), and a processing network 110(C). Multiple accounts may be associated with a single SRT platform. For example, a user may be associated with two different accounts which are each associated with different authentication entities, while both accounts are able to be processed using a single SRT platform. The SRT server 110(A), may be configured to identify one or more facilitator applications 112 associated with an account and cause the user to be authenticated using one of those facilitator applications 112. This may involve communicating a request for authentication to a facilitator application server 114 associated with a particular facilitator application 112.

Additionally, once the user has been authenticated, either the client device 102 or the SRT server 110(A) may be configured to generate cryptographic keys and/or a token to be bound (or otherwise associated) with a particular client device 102 which is stored in the respective token data 110(B) so that data received from that client device 102 may be verified using a stored public key. The token and cryptographic keys may be bound to the client device 102 upon receiving an indication that the client device 102 has been verified by an authorization entity server 106. In some embodiments, the SRT server 110(A) may pass a public key associated with the client device 102 to the initiator server 208, which may verify data received from the client device 102 and generate transaction information that includes the token to be used for a transaction. A mapping between the token and the transaction may be maintained by the SRT server 110(A) in its respective token data. In some embodiments, the SRT server 110(A) may receive a number of files from various authorization entities, each of which may include mappings between email addresses and various PANs. In this way, the SRT server 110(A) may maintain a mapping between user identifier information and accounts.

The facilitator applications 112 may be any suitable set of computer-executable instructions installed on the client device 102 that, when executed, causes the client device 102 to perform an authentication process. In some embodiments, the authentication process may involve the collection of biometric information associated with a user of the client device 102. For example, the facilitator application 112 may obtain voiceprint or fingerprint data to be used to authenticate the user. The facilitator application may be tied to hardware installed on the client device 102. Examples of facilitator applications 112 may include fingerprint, retinal, or voice scanning applications. The hardware associated with those applications may include fingerprint, retinal, or voice scanning hardware such as fingerprint, retinal, or voice sensors. Other types of facilitator applications 112 may also include PIN and password facilitator applications. In some embodiments, a facilitator application 112 may be a wallet SRT server.

The facilitator application server 114 may be any suitable computing device that provides support for a facilitator application 112. In some embodiments, the facilitator application server 114 may perform authentication processing on behalf of the facilitator application 112. For example, the facilitator application 112 may cause the client device 102 to obtain authentication data from a user of the client device 102. Once obtained, the authentication data may be transmitted to the facilitator application server 114 that corresponds to the facilitator application used to collect the authentication data. The authentication data may then be compared to authentication data on record for that user by the facilitator application server 114. Once a user has been authenticated, the facilitator application server 114 and/or facilitator application 112 may generate an authentication result indicating that the user has been authenticated. The client device 102 may sign the received the authentication result using a private key specific to the client device 102 and stored by the client device 102.

For an illustrative example of at least some embodiments of the disclosure, consider a scenario in which a user wishes to enroll into the system described herein and conduct a transaction. In this scenario, the user may request enrollment with a particular authorization entity server 106. The request may be made in relation to a particular account maintained by that authorization entity server 106 (e.g., a credit card account maintained by a banking institution). The authorization entity server 106 may reference account data stored in association with the particular account in order to identify contact information. Once identified, the authorization entity server 106 may transmit a verification message to the user via the stored contact information. In some embodiments, the verification message may include a one-time password (OTP) or other dynamic verification data, which the user may be required to enter via the client device 102 to be verified. Once verified, the authorization entity server 106 may provide an indication of the client device 102 to the SRT platform 110. A token and cryptographic keys may be generated for the client device 102 either by the authorization entity server 106, the client device 102, or the SRT platform 110. Once generated, the token and at least a private cryptographic key of a cryptographic key pair may be transmitted to the client device 102.

Once the client device 102 has been enrolled using the illustrative scenario above, the user may access a merchant (resource provider 104) website to complete a transaction (e.g., make a purchase). In this scenario, the user may, upon selecting a number of items for the transaction, be served a checkout page for the merchant website. The checkout page may include a list of the items, prices, quantities, or any other suitable transaction-related information. In addition, the checkout page may include a checkout element that may be selected to initiate a transaction. Once the checkout element has been selected, the user may be given the ability to select an account associated with the authorization entity server 106 to be used to complete the transaction.

Upon receiving a selection of account associated with the authorization entity server 106 to be used to complete the transaction, the SRT platform 110 may cause a facilitator application 112 to be executed in order to authenticate the user. The facilitator application 112 may then execute an authentication process and, upon completion of the authentication process, may return an authentication indicator that indicates whether or not the user is authenticated to the client device 102. In this scenario, the client device 102 may then sign the authentication indicator by performing a cryptographic algorithm on the authentication indicator using the private cryptographic key of the cryptographic key pair. The signed authentication indicator may be provided to the SRT platform 110 via the initiator application server 108.

Upon verifying the authentication indicator and confirming that the user is authenticated, the SRT platform 110 may provide the token associated with the client device 102 back to the initiator application server 108. The initiator server 108 may subsequently use the received token to complete the requested transaction.

For clarity, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the internet), using any suitable communication protocol.

Figure 2:
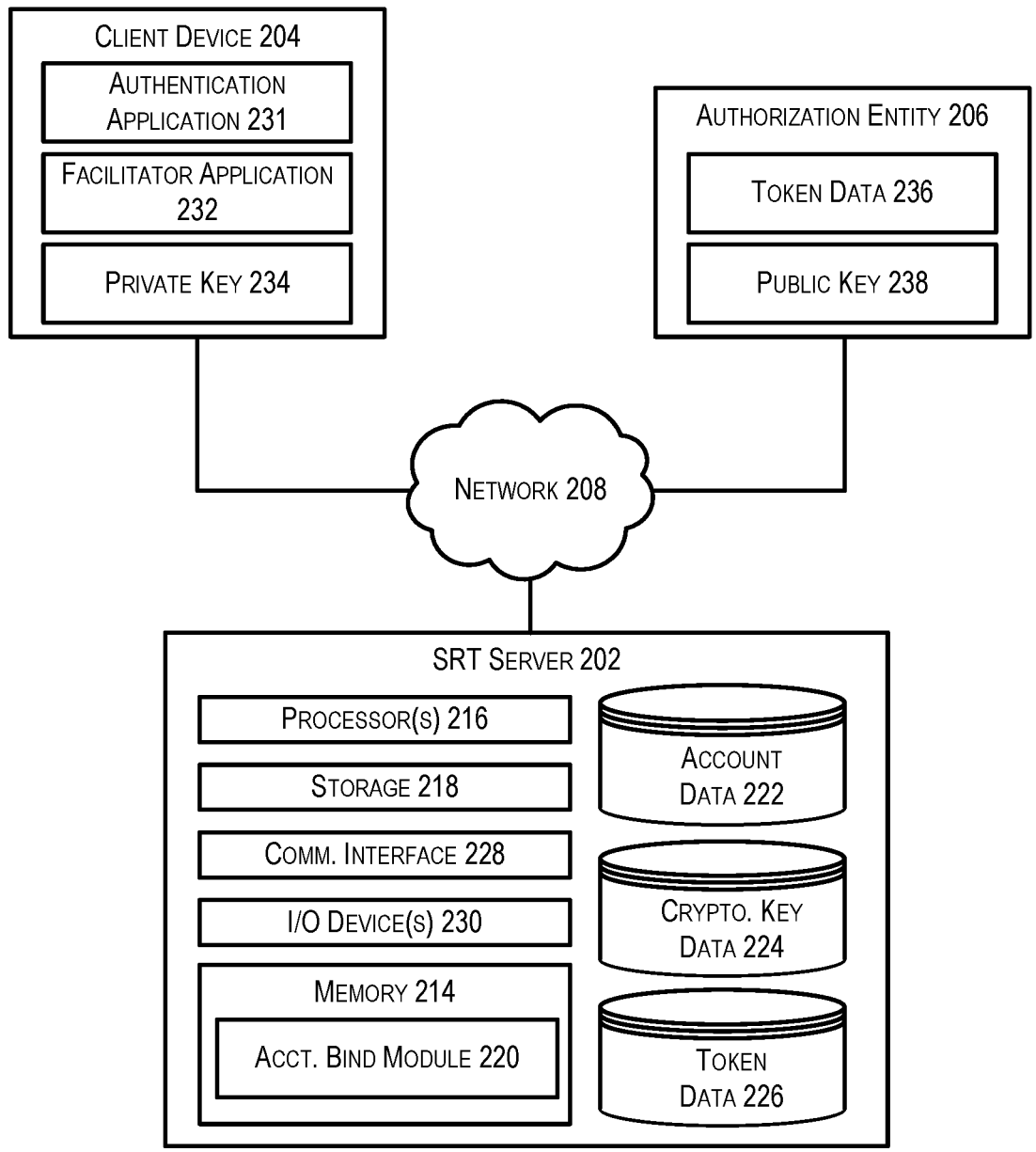
FIG. 2 depicts an example system architecture that may be implemented to provide secure remote transaction in accordance with embodiments of the disclosure.

FIG. 2 depicts an example system architecture that may be implemented to provide secure remote transaction in accordance with embodiments of the disclosure. In FIG. 2, a SRT server 202 may be in communication with a number of client devices 204 and authorization entity servers 206 via a network connection 208. The network connection 208 may include at least a transaction processing network. In some embodiments, the SRT server 202 may be an example SRT server 110 of FIG. 1.

In at least some embodiments, the SRT server 202 may include at least one memory 214 and one or more processing units (or processor(s)) 216. The processor(s) 216 may be implemented as appropriate in hardware, computer-executable instructions, firmware or combinations thereof. Computer-executable instruction or firmware embodiments of the processor(s) 216 may include computer-executable or machine executable instructions written in any suitable programming language to perform the various functions described.

The memory 214 may store program instructions that are loadable and executable on the processor(s) 216, as well as data generated during the execution of these programs. Depending on the configuration and type of SRT server 202, the memory 214 may be volatile (such as random access memory (RAM)) and/or non-volatile (such as read-only memory (ROM), flash memory, etc.). The SRT server 202 may also include additional storage 218, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the SRT server 202. In some embodiments, the memory 214 may include multiple different types of memory, such as static random access memory (SRAM), dynamic random access memory (DRAM) or ROM.

Turning to the contents of the memory 214 in more detail, the memory 214 may include an operating system and one or more application programs or services for implementing the features disclosed herein including at least a module for binding accounts to tokens and/or cryptographic keys (account binding module 220). The memory 214 may also include account data 222, which provides data stored in association with a user account, cryptographic ley data 224, which provides at least a list of public cryptographic keys stored in association with client devices 204, and/or token data 220, which provides a mapping between a generated token and a transaction or account.

In some embodiments, the account binding module 220 may, in conjunction with the processor 216, be configured to receive an indication from an authorization entity server 206 that a client device 204 is to be enrolled with respect to a particular account. In some embodiments, the indication may include a device identifier for the client device 204 (e.g., a phone number) as well as an account number (e.g., a primary account number (PAN)). In some embodiments, upon receiving the indication, the account binding module 220 may generate a token to be associated with the client device 204. The token may be stored by the SRT server 202 within a token vault (e.g., token data 226) in relation to the client device 204. Additionally, the account binding module 220 may generate a cryptographic key pair to be associated with the client device 204 and the account number. One of the keys of the cryptographic key pair may be assigned as a private key 234 and the other may be assigned as a public key 238. The cryptographic key assigned as the private key 234 may be conveyed to the client device 204 using known secure key delivery protocols. In some embodiments, the private key 234 may be provisioned onto the client device 204 via a message transmitted to the client device 204 by the SRT server 202 (e.g., via the received device identifier). In some embodiments, the private key 234 may be provisioned onto the client device 204 via a message transmitted to the client device 204 by the authorization entity server 206. In some embodiments, the public key 238 may be transmitted to the authorization entity server 206. In some embodiments, the account binding module 220 may be configured to verify the authenticity of an authentication indicator which has been signed by a client device 204 using the private key 234.

In some embodiments, the account binding module 220 may be further configured to generate a token upon receiving an indication that an authentication indicator received from a client device 204 has been verified. In some embodiments, the token may be a one-time use token which is only authorized for use with the specific transaction at issue. In some embodiments, the token may be specific to both the client device 204 and the resource provider, in that the token may be used multiple times by the resource provider for that client device 204 (e.g., a "card on file" token). For example, upon conducting with a particular client device 204 for the first time, the resource provider may receive a token generated in the manner described herein. The resource provider may then store the token in memory for use with the client device 204 until an expiration date (or some other suitable expiration condition) associated with that token. The account mapping module 220 may store the generated token in a token vault (e.g., token data 226) with a mapping to the account for which the token was generated. Upon receiving an authorization request message that includes the token, the SRT server 202 may query the token vault to identify the account associated with the token. The SRT server 202 may then proceed with the transaction of the authorization request message using the identified account information.

The SRT server 202 may also contain communications interface(s) 228 that enable the SRT server 202 to communicate with a stored database, another computing device or server, one or more remote devices, other application servers, and/or any other suitable electronic devices. In some embodiments, the communication interface 228 may enable the SRT server 202 to communicate with other electronic devices on a network (e.g., on a private network). The SRT server 202 may also include input/output (I/O) device(s) and/or ports 230, such as for enabling connection with a keyboard, a mouse, a pen, a voice input device, a touch input device, a display, speakers, a printer, etc.

The client device 204 may be any electronic device capable of communicating with other electronic devices. For example, the client device 204 may be a mobile phone capable of wirelessly communicating with a number of other electronic devices. In some embodiments, the client device 204 may be an example of client device 102 depicted in FIG. 1. The client device 204 may have installed upon it a number of software modules, including an authentication application 231 and at least one facilitator application 232. In some embodiments, the client device may also include, in its memory, at least one private key 234. In some embodiments, the authentication application 231 may include computer executable instructions that cause the client device 204 to perform at least a portion of the functionality described herein. For example, in some embodiments, the authentication application 231 of the client device 204 may be configured to generate the private key 234 (and the related public key 238) in response to verifying that received authentication data.

In some embodiments, the facilitator application 232 may be a mobile application installed upon, and executed from, the client device 204. In accordance with at least some embodiments, the facilitator application 232 may be configured to authenticate the user and generate an authentication indicator that indicates whether or not the user is authenticated. The authentication application 231 of the client device 204 may then be configured to sign the authentication indicator by performing a cryptographic algorithm on the authentication indicator using the private cryptographic key 234 which has been provided to the client device by the account binding module 220 as described above. It should be noted that there are a number of techniques for signing data in this manner that would be known to one skilled in the art. In some embodiments, the client device 204 may store a token generated by the account binding module 220 described above. However, it should be noted that the client device need not be provided the token in at least some embodiments.

In some embodiments, the authorization entity 206 may be an example of authorization entity server 106 depicted in FIG. 1, which may be configured to determine whether a particular transaction should be authorized. The authorization entity 206 may maintain a number of accounts, at least one of which may be associated with a client device 204. In some embodiments, the authorization entity 206 may maintain a number of tokens 236 which are mapped to accounts that are maintained by the authorization entity. In some embodiments, the authorization entity 206 may maintain one or more public keys 238 associated with particular client devices 204. It should be noted that in some embodiments, the authorization entity 206 may not store token data 236 or public keys 238 (e.g., the data may be stored on the SRT server 202).

Figure 3:
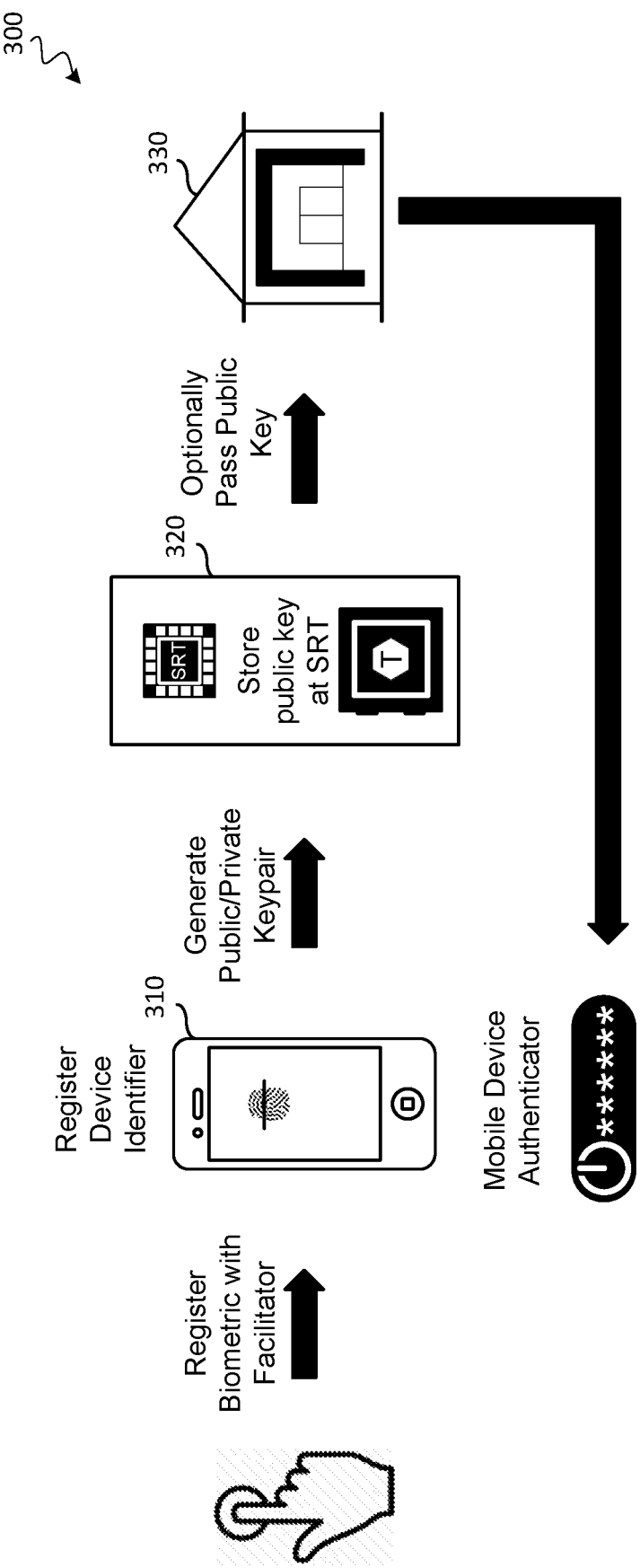
FIG. 3 illustrates a registration process for an authentication system, according to some embodiments.

FIG. 3 illustrates a registration process for an authentication system 300, according to some embodiments. Authentication system 300 may include a communication device operated by a user such as client device 310, and a secure remote server 320. In some embodiments in which system 300 is used to authenticate a user to conduct transactions, system 300 may also include an issuer 330 (an example of an authorization entity) associated with an account of the user. Client device 310 may have an authentication application installed therein. The authentication application can be, for example, downloaded from an application store or be pre-installed on client device 310. In some embodiments, the authentication application can be compatible with multiple service providers, and can be used to authenticate the user with different service providers. Secure remote server 320 may securely store credentials associated with a user's account, and can be configured to release the user's credentials upon successful authentication of client device 310 to secure remote server 320. In some embodiments, secure remote sever 320 can be associated with or be operated by a token service provider.

The registration process may begin by the user launching the authentication application on client device 310. The user may select a biometric facilitator to register with the authentication application. Examples of a biometric facilitator may include a facilitator application configured to cause the client device 310 to obtain fingerprint, retina scan, facial recognition, voice recognition, or other unique human characteristics that can be detected by client device 310. In some embodiments, the presence of a secondary device coupled or in proximity to client device 310 can be used as an alternative facilitator. The user may register multiple types of facilitators with the authentication application, and may only need to register each particular facilitator once. The registered facilitator(s) can then be selected for use to authenticate the user to one or more compatible service providers.

Next, the user may select a compatible service provider and configure which facilitator will be used to authenticate the user to the service provider. One or more facilitators can be selected for a particular service provider. In some embodiments, different facilitators or different combination of facilitators can be used for different service providers. When multiple facilitators are selected for a particular service provider, the user can be authenticated when all of the multiple facilitators are verified, or when one of the multiple facilitators is verified. In some embodiments, the facilitators can be prioritized such that a higher priority facilitator is requested first, and after a predetermined number of unsuccessful attempts, a lesser priority facilitator can be requested. In some embodiments, the user may also optionally register the phone number or other device identifier of client device 310 with the service provider.

Upon linking the selected facilitator(s) to a particular service provider, the authentication application may generate a public/private key pair and associate the public/private key pair with the service provider. The public key may then be sent to the secure remote server 320 associated with the service provider for storage. In some embodiments, the public key can also be optionally sent to an issuer 330, and issuer 330 may generate a one-time passcode (OTP) and send the OTP to client device 310 for verification. Client device 310 may send the OTP back to secure remote server 320 to verify that client device 320 is a valid device of the user, and issuer 330 and/or secure remote server 320 may then provision a token for the user's account, and associate the token with the selected facilitator(s) and public key. In some embodiments, the token is not required to be stored on client device 310. Instead, the token can be stored at secure remote server 320 and is released by secure remote server 320 upon authentication of the user and client device 310 to secure remote server 320. This may enhance the security of the system because the token is not resident on client device 310, and thus cannot be compromised by malware on client device 310.

Figure 4:
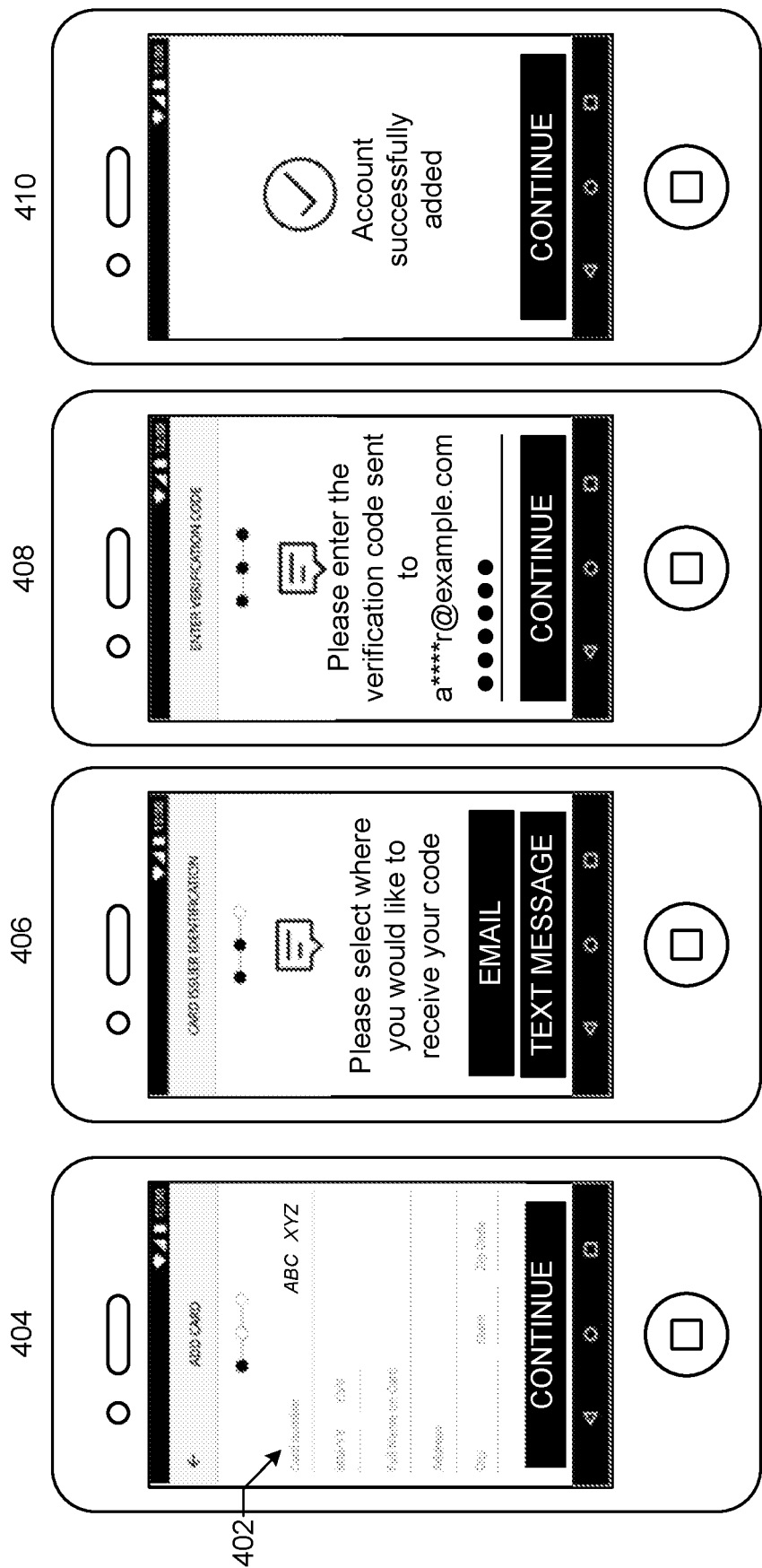
FIG. 4 depicts an example provisioning process by which a user is able to manually add his or her accounts to be processed by the SRT platform and a private key and/or token may be provisioned onto a client device in accordance with some embodiments.

FIG. 4 depicts an example provisioning process by which a user is able to manually add his or her accounts to be processed by the SRT platform and a private key and/or token may be provisioned onto a client device in accordance with some embodiments.

In this example provisioning process, the user may provide an indication of one or more accounts with which he or she is associated to the SRT platform. In some embodiments, the SRT platform may identify and contact an authorization entity (e.g., an issuer) associated with the indicated account. For example, the SRT platform may identify an authorization entity associated with a particular account indicated by the user based on an indicator within the provided account information. The SRT server may, in turn, communicate with that authorization entity to verify the account. An authorization entity associated with the account may then verify that the user is associated with the account. An authentication process may then be performed as described herein.

In some embodiments, this process may involve requiring a user to provide at least one account number via an input field 402 at 404. The SRT platform may then determine, based on the account number provided, a transaction processing network and/or an authorization entity associated with the account. It should be noted that at least some account identifiers may include a banking identification number (BIN) that can be used to identify both the transaction processing network and the authorization entity as a portion of the account number. The SRT platform may then communicate with the identified authorization entity associated with the identified transaction processing network.

In some embodiments, the identified authorization entity associated with the identified transaction processing network may identify one or more communication channels associated with the user of the account. For example, the user may be associated with a particular communication channel upon opening an account with the authorization entity. The one or more communication channels, or at least an obfuscated version of those communication channels, may be presented to the user at 406 to enable the user to verify his or her ownership of the account via those communication channels. In some embodiments, multiple communication channels may be presented to the user for his or her selection. In some embodiments, a default communication channel may be selected over which to communicate with the user.

Once an appropriate communication channel has been identified, the authorization entity or the SRT platform may transmit verification details to the user via the identified communication channel. In some embodiments, the verification details may include a code or pin. The user may then be required to provide those verification details back at 408 in order to verify that the user at least has access to the communication channel.

In some embodiments, once a user has been verified as being an owner of the account using the techniques depicted in FIG. 4, a private cryptographic key may be provisioned onto the client device from which the process was initiated. The private cryptographic key may be generated by the SRT server and may be used by the client device to sign an authentication indicator in the future.

By way of illustrated example, as depicted in FIG. 4, a user may be prompted to enter an account to be linked to himself or herself at 404. In this example, the authorization entity, once contacted, may initiate a verification process. For example, the authorization entity may provide verification details (e.g., a one-time code) to a communication channel known to be associated with the user. To do this, the authorization entity may provide the user with a choice of communication channel to which the verification details will be transmitted at 406. The user may then be asked to retrieve the verification details in order to verify that the user is authentic at 408. If the verification details provided by the user match those sent via the selected communication channel, then the account may be verified as being associated with the user at 410 and a private key may be provisioned onto the client device. It should be noted that the verification process described herein may be separate from the authentication process described elsewhere. In some embodiments, even though the user has verified his or her ownership of an account in the manner depicted in FIG. 4, the user may still be authenticated using the other techniques described herein. Upon being authenticated using the techniques described herein, an authentication indicator generated as a result of that authentication may be signed using the provisioned private key.

Figure 5:
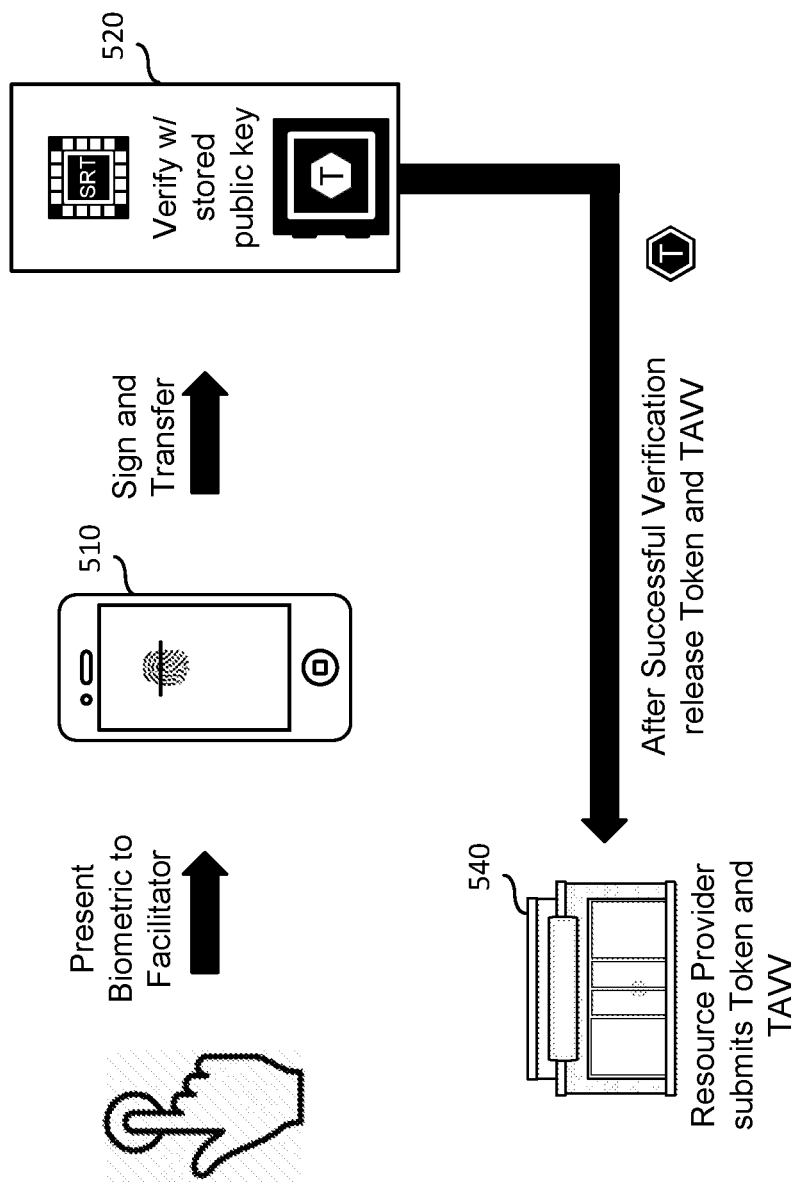
FIG. 5 illustrates a process for authenticating the user with a service provider using the authentication system, according to some embodiments.

FIG. 5 illustrates a process for authenticating the user with a service provider using the authentication system, according to some embodiments. When the user intends to access an account, service, or function associated with a service provider, the user may launch an application associated with the service provider on client device 510. The application can be the same authentication application that was used to register the user's facilitators, a dedicated application provided by or associated with the service provider (e.g., mobile wallet, mobile payment application, merchant application, etc.), or can be a web browser via which the user can access a web page or login page of the service provider. The application may determine one or more facilitators previously linked to the service provider that the user is attempting to access, and request the user to provide the one or more facilitators associated with the service provider. In some embodiments, the application may request the user to provide all of the facilitators if a combination of facilitators are used, or may request the facilitators according to a prioritized order. The user may then provide the facilitator to client device 510. Upon verifying that the facilitator(s) provided by the user match the previously registered facilitator(s), client device 510 may sign an authentication indicator using the private key linked to the user's account with the service provider.

An access request including the signed authentication indicator is then sent to secure remote server 520 to indicate to secure remote server 520 that the user has successfully been authenticated to client device 510. In some embodiments, the access request may include data representing the facilitator, or an indicator indicating which facilitator(s) were provided by the user. Secure remote server 520 may then verify the signature by using the stored public key linked to the user's account associated with the service provider. Upon verifying the signature, the secure remote server 520 may grant the user access to the service provider.

In embodiments in which the secure remote server 520 is associated with a token service provider, secure remote server 520 may release a token associated with the user's account to a merchant 540 to enable the user to conduct a transaction with merchant 540. In some embodiments, the access request may also include transaction details of the transaction, and secure remote server 520 may generate a transaction authentication verification value and provide the transaction authentication verification value with the token. For example, the transaction authentication verification value can be a cryptogram generated based on the transaction details and/or the token. Merchant 540 can then provide the token or the token together with the transaction authentication verification value in an authorization request message to request authorization for the transaction.

In some scenarios, the user may access the service provider using a different device than the communication device that was used for registering the user's facilitators. As such, the device that the user is using to access the service provider may not have the previously stored facilitators or sensor hardware necessary to authenticate the user. For example, the user may access a merchant's website using a desktop computer instead of the user's client device, and the desktop computer may not have a fingerprint reader or access to the user's previously stored fingerprint data to properly authenticate the user. In such scenarios, a cross-device authentication scheme can be employed.

Figure 6:
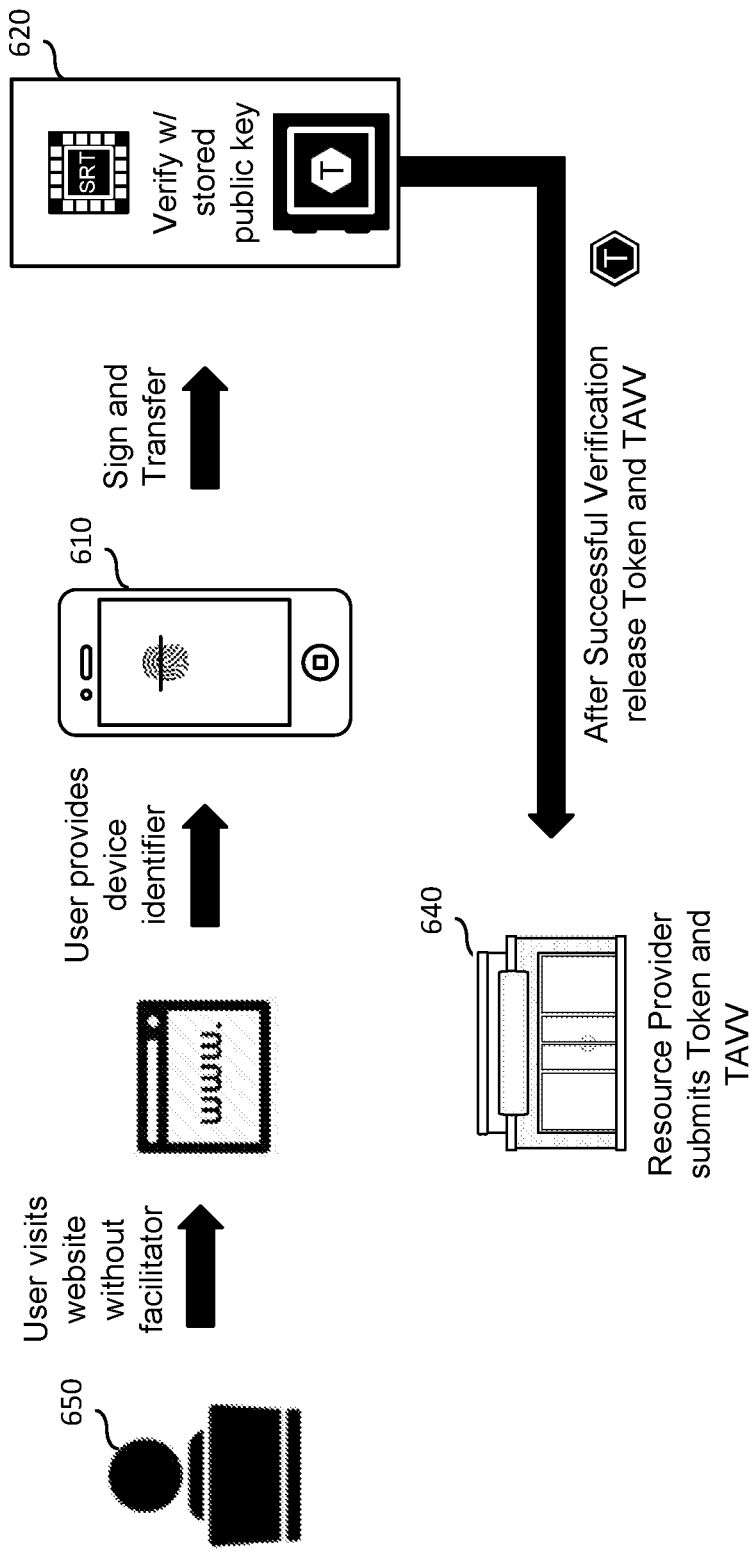
FIG. 6 illustrates a process for authenticating the user with a service provider using multiple devices, according to some embodiments.

FIG. 6 illustrates a process for authenticating the user with a service provider using multiple devices, according to some embodiments. When the user attempts to access a service provider from a different device, such as visiting the service provider's web site using a web browser on device 650 that does not have the previously stored facilitators, the user may enter a device identifier such as a phone number or an IP address associated with the communication device 610 that does have the device identifiers. Device 650 may then push an authentication request to communication device 610. In response, communication device 610 may request the user to provide the facilitator(s) associated with the service provider. The user may then provide the facilitator to client device 610. Upon verifying that the facilitator(s) provided by the user match the previously registered facilitator(s), communication device 610 may sign an authentication indicator using the private key linked to the user's account with the service provider.

An access request including the signed authentication indicator is then sent to secure remote server 620 to indicate to secure remote server 620 that the user has successfully been authenticated to communication device 610. In some embodiments, the access request may include data representing the facilitator, or an indicator indicating which facilitator(s) were provided by the user. Secure remote server 620 may then verify the signature by using the stored public key linked to the user's account associated with the service provider. Upon verifying the signature, the secure remote server 620 may grant the user access to the service provider.

In embodiments in which the secure remote server 620 is associated with a token service provider, secure remote server 620 may release a token associated with the user's account to a merchant 640 whose website the user is accessing on device 650 to enable the user to conduct a transaction with merchant 640. In some embodiments, the access request may also include transaction details of the transaction, and secure remote server 620 may generate a transaction authentication verification value and provide the transaction authentication verification value with the token. For example, the transaction authentication verification value can be a cryptogram generated based on the transaction details and/or the token. The transaction authentication verification value can accompany a token in an authorization request message and can serve as proof that the token is being used in an appropriate corresponding transaction channel or mode (e.g., physical point of sale vs. e-commerce). Merchant 640 can then provide the token or the token together with the transaction authentication verification value in an authorization request message to request authorization for the transaction.

Figure 7:
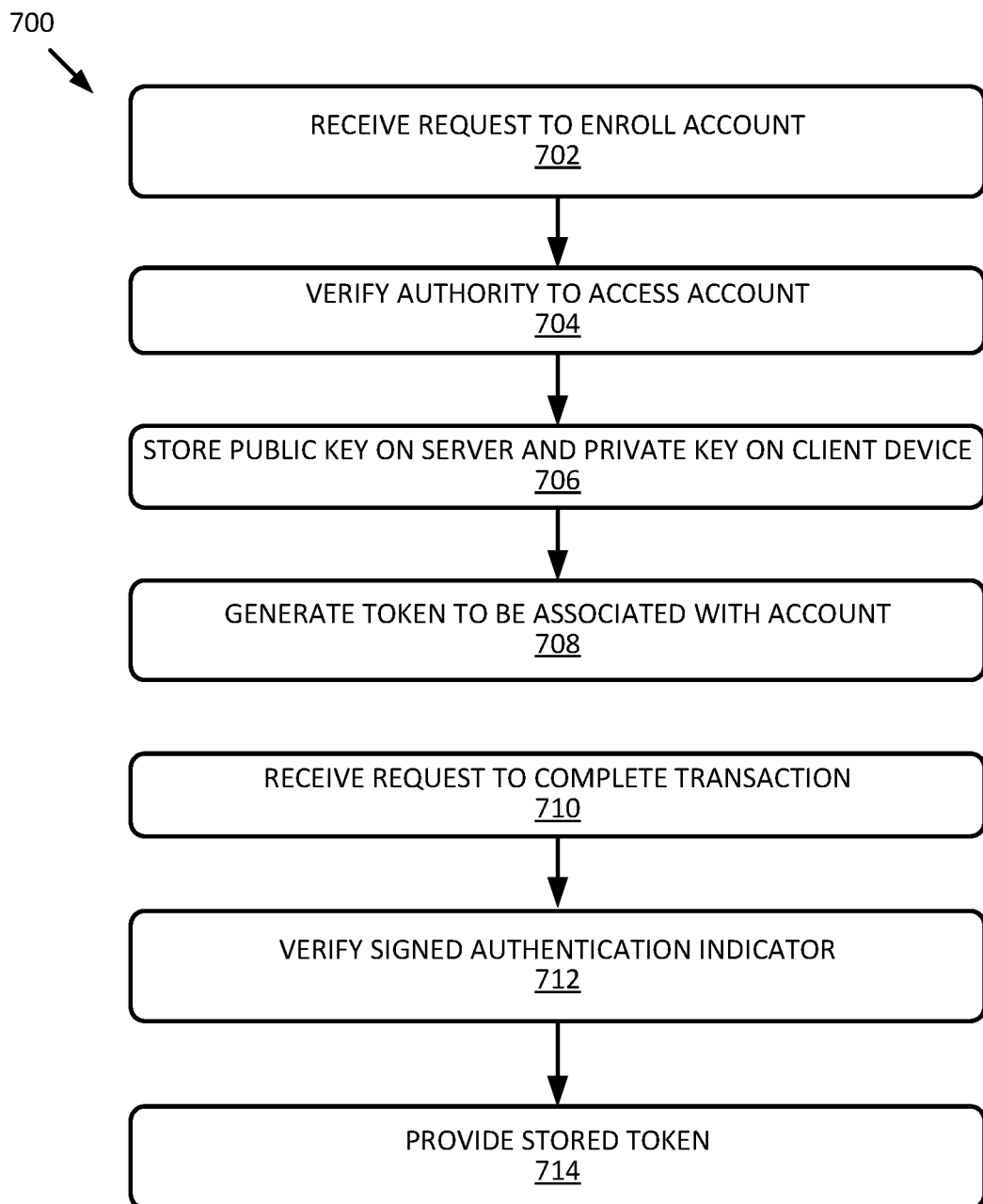
FIG. 7 illustrates a flow diagram of a process for performing authentication of users in accordance with at least some embodiments.

FIG. 7 illustrates a flow diagram of a process 700 for performing authentication of users in accordance with at least some embodiments. Process 700 can be performed on a secure remote transaction server 202 depicted in FIG. 2.

Process 700 may begin at 702, when a request is received to enroll an account with the system described herein. In some embodiments, the request may be submitted by a user of a client device via a mobile application installed upon the mobile device. In some embodiments, the request may be conveyed to a secure remote transaction server from an authorization entity. For example, upon submission of a request to enroll an account into the system described by a user, the request may be transmitted to an authorization entity. The authorization entity may then forward the request to the secure remote transaction server. In this example, the authorization entity may determine whether the user of the client device is authorized to access the account before or after the request has been forwarded to the secure remote transaction server.

At 704, the process may involve determining that the user is authorized to access the account. In some embodiments, this may involve either the secure remote transaction server or the authorization entity associated with the account contacting the user via a communication channel stored in relation to the account. For example, upon creation of the account, the user may be required to provide a communication channel (e.g., an email address or phone number) that will be associated with the account via a know-your-customer (e.g., KYC) process. In this example, the user may be contacted via the communication channel provided during the creation of the account. In some embodiments, determining that the user is authorized to access the account may involve transmitting a one-time passcode to the user via the communication channel and causing the client device to prompt the user to enter the one-time passcode. In these embodiments, the user may be determined to be authorized to access the account upon determining that the one-time passcode entered by the user matches the transmitted one-time passcode.

At 706, a cryptographic key pair may be generated in relation to the account. At least the public key of the cryptographic key pair may be stored upon the secure remote transaction server. At least the private key of the cryptographic key pair may be stored upon the client device. In some embodiments, the cryptographic key pair may be generated by the client device. For example, the client device may generate a cryptographic key pair and may subsequently transmit the public key to the secure remote transaction server. In some embodiments, the secure remote transaction server may generate the cryptographic key pair. For example, the secure remote transaction server may generate a cryptographic key pair and may subsequently transmit the private key to the client device. In some embodiments, in addition to storing the public key, the secure remote transaction server may forward the public key to an authorization entity associated with the account being enrolled.

At 708, the process may involve generating a token to be associated with the account. In some embodiments, the token may be generated by the secure remote transaction server. In some embodiments, the token may be generated by an authorization entity server and transmitted to the secure remote transaction server. The generated token may then be stored in association with the account.

At 710, the process may involve receiving a request to complete a transaction. In some embodiments, the request may be received at a secure remote transaction server from an access device that manages access to one or more resources. The request may include various details related to the requested transaction along with a signed authentication indicator. For example, upon initiation of the requested transaction, the user may be prompted to provide one or more biometric samples. The biometric samples provided by the user may be processed by a facilitator application on the client device to determine the authenticity of the user. Once determined, the facilitator application may generate an authentication indicator that indicates a likelihood that the user requesting the transaction is the user enrolled into the account. The client device may then sign this authentication indicator by performing a cryptographic operation on the authentication indicator using the private key generated and stored on the client device at 706. The signed authentication indicator may be provided to the secure remote transaction server within the request received at 710.

At 712, upon receiving the signed authentication indicator, the secure remote transaction server may verify the signed authentication indicator by performing a second cryptographic operation on the signed authentication indicator using the public key generated at 706 and stored at the secure remote transaction server. In this process, the second cryptographic operation may result in the creation of an unsigned version of the authentication indicator, which may then be processed to determine whether the user is authenticated. In some embodiments, the unsigned version of the authentication indicator may be compared to an expected authentication indicator result. In some embodiments, a likelihood value in the unsigned version of the authentication indicator may be compared to an acceptable risk threshold value to determine whether the transaction should be conducted. For example, a generated unsigned version of the authentication indicator may include a likelihood that the user requesting the transaction is the user enrolled into the account. In this example, the likelihood may be compared to a predetermined threshold value. If the likelihood is greater than the predetermined threshold value, then the signed authentication indicator may be verified. Upon verification of the signed authentication indicator, the process may involve initiating the requested transaction at 714. This may involve providing the token stored in association with the account at 708 to the access device from which the request was received at 710.

Figure 8:
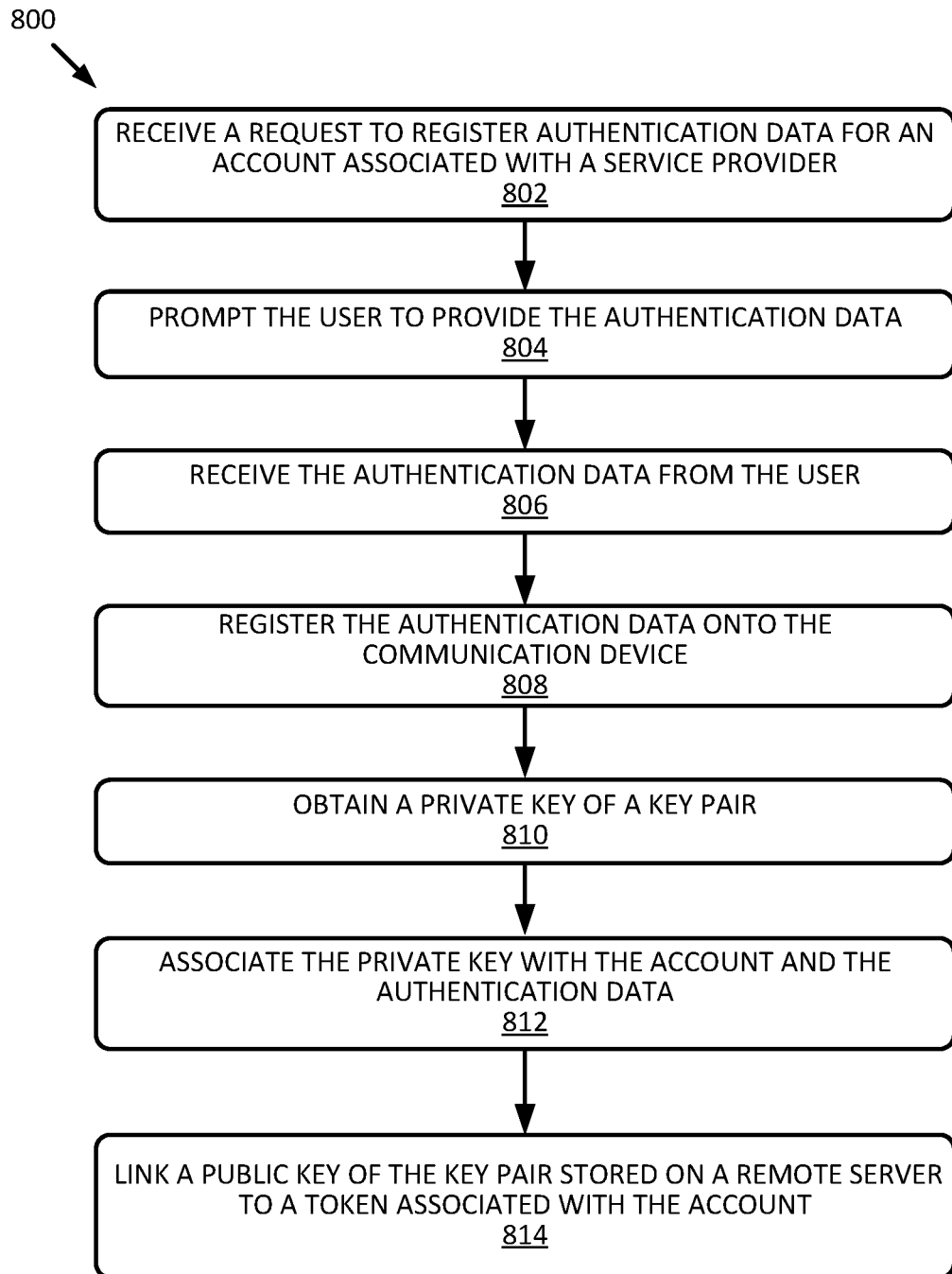
FIG. 8 illustrates a flow diagram of a process for registering authentication data in accordance with at least some embodiments.

FIG. 8 illustrates a flow diagram of a process 800 for registering authentication data in accordance with at least some embodiments. Process 800 can be performed on a communication device operated by a user, which may be an example of a client device 102 depicted in FIG. 1.

Process 800 may begin at block 802 by receiving a request to register authentication data for an account associated with a service provider. In some embodiments, a user may indicate an account or accounts to register. For example, the user may select one or more credit card numbers or banking account numbers to enroll into the system.

At block 804, the user may be prompted to provide the authentication data. In some embodiments, the user may select what type of authentication data to provide as well as an application to authenticate the user (e.g., a biometric facilitator). In some embodiments, an application may be automatically selected by the system to authenticate the user. It should be noted that the application that performs the authentication (e.g., the facilitator application) may be different from the application used to request to register with the system.

At bock 806, the authentication data is received from the user, for example, via a sensor on the communication device. For example, the user may provide a biometric sample to the client device that includes fingerprint, voiceprint, facial images, or other suitable biometric information. At block 808, the received authentication data may be registered and stored onto the communication device or onto a remote sever that supports a facilitator application installed upon the communication device (e.g., a facilitator application server). The authentication data may then be processed to authenticate a user of the communication device. For example, a facilitator application may generate an authentication indicator indicating whether or not the user has been authenticated.

At block 810, a public and private key pair may obtained by the communication device. In some embodiments, at least a private key may be received by the communication device from a secure remote server (e.g., an SRT server). For example, the communication device may send an authentication indicator to the secure remote server, along with enrollment data, and may receive a private key generated by the secure remote server. In some embodiments, the public and private key pair of the cryptographic key pair may be generated by the communication device. In some embodiments, the cryptographic key pair may be generated using information obtained from the secure remote server and/or information related to the communication device. For example, the communication device may receive a base key pair from the secure remote server and may generate the cryptographic key pair using some algorithm for modifying the base key pair using information from the communication device. At block 812, the private key is associated with the account and the authentication data and stored on the communication device.

At block 814, the generated public key is sent to a secure remote server, and the secure remote server links the public key to a token associated with the account. In some embodiments, the token can be used by the user to access services associated with the account, and may act as a substitute for a real account identifier of the account.

Figure 9:
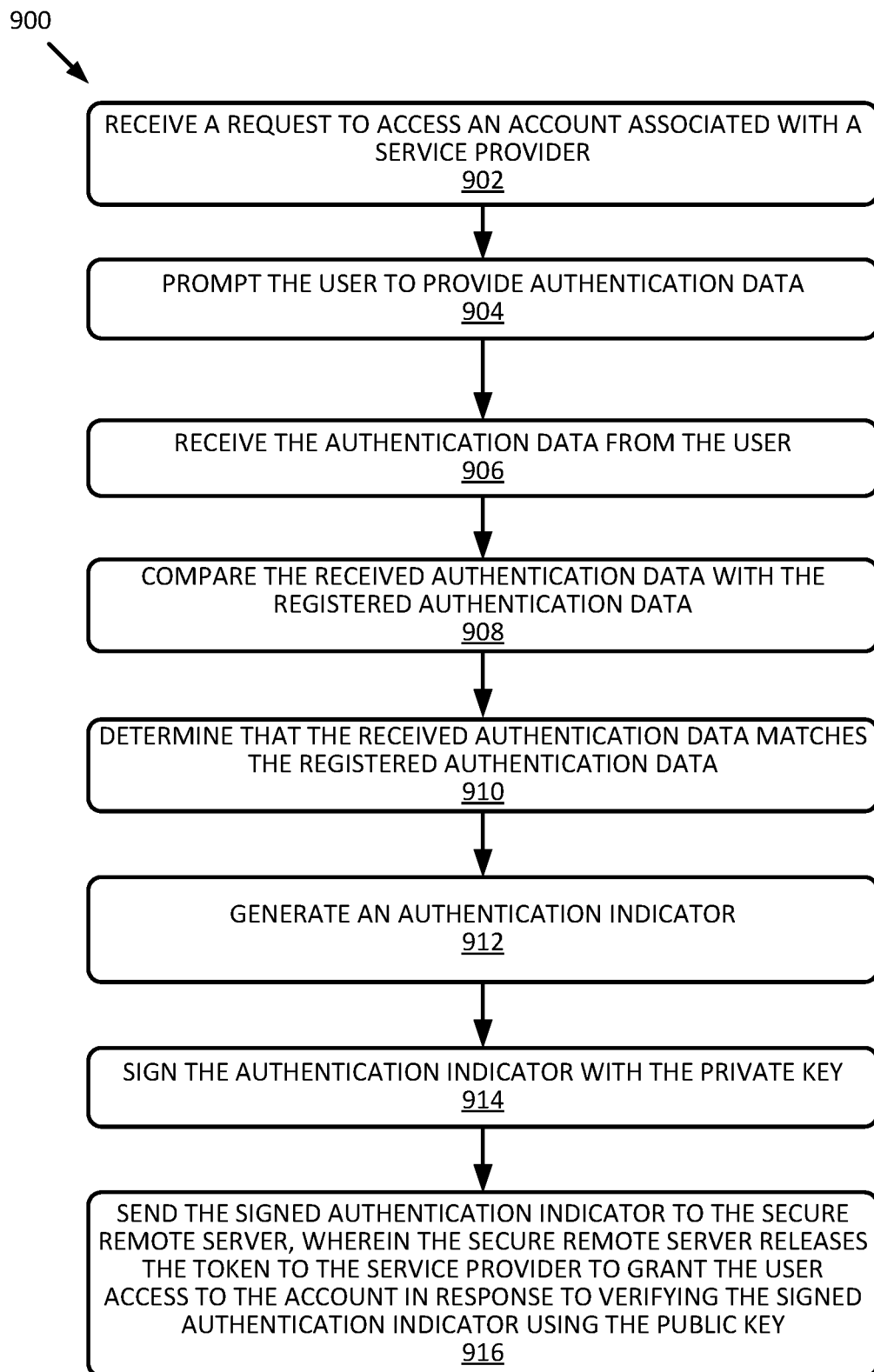
FIG. 9 illustrates a flow diagram of a process for accessing an account, according to some embodiments.

FIG. 9 illustrates a flow diagram of a process 900 for accessing an account, according to some embodiments. In accordance with at least some embodiments, process 900 may be performed on a communication device, which may be an example of a client device 102 depicted in FIG. 1.

Process 900 may begin at block 902 by receiving a request to access an account from the user's communication device. At block 904, the user may be prompted to provide the authentication data previously registered for the account. In some embodiments, the user may be prompted to provide authentication data via a mobile application (e.g., a facilitator application) installed upon the communication device which is separate from a mobile application via which the user has requested access to the account.

At block 906, the authentication data is received from the user, for example, via a sensor on communication device. At block 908, the received authentication data is compared with the registered authentication data. At block 910, the received authentication data is determined to match the registered authentication data. In some embodiments, the registered authentication data may be stored on a remote server that supports a biometric facilitator application and this step may involve providing the received authentication data to that remote server for verification. In some embodiments, the registered authentication data may be stored on, and verified upon, the communication device.

At block 912, in response to determining a match, an authentication indicator is generated to indicate that the user has been verified. At block 914, the generated authentication indicator may be signed using the private key stored on the communication device in relation to the account.

At block 916, the signed authentication indicator may be sent to the secure remote server within an access request. The secure remote server may verify the signed authentication indicator using the public key associated the account, and in response to determining that the authentication indicator is verified, releases the token associated with the account to the service provider to grant the user access to the account. In some embodiments, verification of the authentication indicator may involve performing a cryptographic operation on the signed authentication indicator using the public key that results in generation of an unsigned version of the authentication indicator. The unsigned version of the authentication indicator may then be compared to an expected unsigned version of the authentication indicator.

Embodiments of the disclosure provide for a number of technical advantages over conventional systems. For example, embodiments of the disclosure enable authentication of a user by leveraging existing facilitator applications on a mobile device, while enabling an SRT platform and authorization entity to be assured that the authentication was performed by a legitimate client device. As authorization entities are not currently able to receive this assurance in conventional systems, this represents a technical improvement over such systems (as those systems do not include the technical means to provide this functionality). Further, as indicated by the above-described process flows, embodiments of the invention can be used to securely authenticate a device and a user of that device when conducting a remote transaction, without requiring a user to enter a PIN or password. Further, since tokens and transaction authentication verification values are used in embodiments of the invention, sensitive data such as account numbers, PII (personal identifiable information), etc., can be protected in transit.

Although some of the examples described above are described in the context of secure remote commerce transactions, it is understood that embodiments of the invention can be used in other contexts in which authentication and data security issues are present. For example, embodiments of the invention can be used to obtain access to secure data (e.g., medical records, personal data such as tax records, etc.) or can be used in situations where a user may wish to obtain access to a secure location such as a building or a transit station.

A computer system will now be described that may be used to implement any of the entities or components described herein. Subsystems in the computer system are interconnected via a system bus. Additional subsystems include a printer, a keyboard, a fixed disk, and a monitor which can be coupled to a display adapter. Peripherals and input/output (1/0) devices, which can couple to an 1/0 controller, can be connected to the computer system by any number of means known in the art, such as a serial port. For example, a serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer-readable medium.

The techniques described herein may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a," "an," or "the" is intended to mean "at least one," unless specifically indicated to the contrary.

What is claimed is:

1. A computer-implemented method comprising:
   receiving, at a secure remote transaction server from a client device, a request to enroll an account, wherein a user of the client device selects a prioritized order of multiple facilitators to be used by an authentication application to authenticate the user for a particular service provider, where different facilitators are selected for different service providers;

verifying, by the secure remote transaction server, that the client device has authority to access the account;

storing, by the secure remote transaction server, at least a public key of a cryptographic key pair in association with the account, wherein at least a private key of the cryptographic key pair is stored on the client device in association with the account;

generating, by the secure remote transaction server, a token to be associated with the account, the token being stored in association with the account;

receiving, by the secure remote transaction server from an access device, a request to complete a transaction in association with the account, the request including a signed authentication indicator, wherein an authentication indicator is signed by the authentication application using the private key to form the signed authentication indicator, after one or more of the multiple facilitators authenticate the user of the client device according to the prioritized order of the multiple facilitators, wherein the multiple facilitators are prioritized such that a higher priority facilitator is requested first, and after a predetermined number of unsuccessful authentication attempts, a lesser priority facilitator is to be requested;

verifying, by the secure remote transaction server, the signed authentication indicator using the public key stored in associated with the account; and upon verifying the signed authentication indicator, providing the token to the access device.

2. The computer-implemented method of claim 1, wherein the signed authentication indicator has been generated by the client device by performing a first cryptographic operation using the private key.

3. The computer-implemented method of claim 2, wherein verifying the signed authentication indicator using the public key comprises performing a second cryptographic operation on the signed authentication indicator using the public key.

4. The computer-implemented method of claim 1, wherein verifying that the client device has authority to access the account comprises:
identifying, by the secure remote transaction server, an authorization entity associated with the account based on information in the request; and
verifying, by the secure remote transaction server, the authenticity of the account with the authorization entity associated with the account.

5. The computer-implemented method of claim 4, wherein the authenticity of the account is determined by the authorization entity using a one-time passcode.

6. The computer-implemented method of claim 5, wherein the authorization entity transmits the one-time passcode to the client device via a communication channel stored in relation to the account.

7. The computer-implemented method of claim 1, wherein the cryptographic key pair is generated on the client device and the public key is received by the secure remote transaction server from the client device.

8. The computer-implemented method of claim 1, wherein the cryptographic key pair is generated on the secure remote transaction server and the method further comprises transmitting the private key to the client device.

9. The computer-implemented method of claim 1, wherein the public key is forwarded to an authorization entity associated with the account.

10. A secure remote transaction server comprising:
a processor; and
a memory including instructions that, when executed with the processor, cause the secure remote transaction server to, at least:
receive, from a client device, a request to enroll an account, wherein a user of the client device selects a prioritized order of multiple facilitators to be used by an authentication application to authenticate the user for a particular service provider, where different facilitators are selected for different service providers;
verify that the client device has authority to access the account;
store at least a public key of a cryptographic key pair in association with the account, wherein at least a private key of the cryptographic key pair is stored on the client device in association with the account;
generate a token to be associated with the account, the token being stored in association with the account;
receive, from an access device, a request to complete a transaction in association with the account, the request including a signed authentication indicator, wherein an authentication indicator is signed by the authentication application using the private key to form the signed authentication indicator after one or more of the multiple facilitators authenticate the user of the client device according to the prioritized order of the multiple facilitators, wherein the multiple facilitators are prioritized such that a higher priority facilitator is requested first, and after a predetermined number of unsuccessful authentication attempts, a lesser priority facilitator is to be requested;
verify the signed authentication indicator using the public key stored in associated with the account; and
upon verifying the signed authentication indicator, provide the token to the access device.

11. The secure remote transaction server of claim 10, wherein verifying the signed authentication indicator using the public key comprises generating an unsigned version of the signed authentication indicator and assessing the unsigned version of the signed authentication indicator.

12. The secure remote transaction server of claim 11, wherein assessing the unsigned version of the signed authentication indicator comprises comparing the unsigned version of the signed authentication indicator to an expected result.

13. The secure remote transaction server of claim 11, wherein assessing the unsigned version of the signed authentication indicator comprises determining whether a likelihood value in the unsigned version of the signed authentication indicator exceeds a threshold value.

14. The secure remote transaction server of claim 10, wherein the token is subsequently used by the access device to complete the transaction.

15. The secure remote transaction server of claim 10, wherein generating the token to be associated with the account comprises receiving the token from an authorization entity associated with the account.

16. A computer-implemented method comprising:
receiving, by a communication device, a request to register authentication data for an account associated with a service provider;
prompting, by the communication device, a user of the account to provide authentication data;
receiving, by the communication device, the authentication data from the user;
receiving a selection of a prioritized order of multiple facilitators to be used by an authentication application on the communication device to authenticate the user for a particular service provider, where different facilitators are selected for different service providers;

registering, by the communication device, the authentication data onto the communication device;

obtaining, by the communication device, a private key of a cryptographic key pair;

associating, by the communication device, the private key with the account and the authentication data, wherein a secure remote server links a public key of the cryptographic key pair to a token associated with the account;

receiving, by the communication device, a request to access the account;

prompting, by a facilitator of the multiple facilitators of the communication device, the user to provide the authentication data, wherein the multiple facilitators are prioritized such that a higher priority facilitator is requested first, and after a predetermined number of unsuccessful authentication attempts, a lesser priority facilitator is to be requested;

receiving, by the facilitator of the multiple facilitators of the communication device, the authentication data from the user;

comparing, by the facilitator of the multiple facilitators of the communication device, the received authentication data with the registered authentication data;

determining, by the facilitator of the multiple facilitators of the communication device, that the received authentication data matches the registered authentication data;

generating, by the facilitator of the multiple facilitators of the communication device, an authentication indicator indicating the match of the received authentication data to the registered authentication data;

signing, by the communication device, the authentication indicator using the private key; and sending, by the communication device, the signed authentication indicator to the secure remote server in an access request, wherein the secure remote server releases the token to the service provider to grant the user access to the account in response to verifying the signed authentication indicator using the public key.

* * * * *